United States Patent [19]
Schultz et al.

[11] Patent Number: 6,161,154
[45] Date of Patent: Dec. 12, 2000

[54] SYSTEM AND METHOD FOR EXTRACTING AND RESTORING A VIDEO BUFFER FROM/ TO A VIDEO ACQUISITION CYCLE

[75] Inventors: Kevin L. Schultz, Georgetown; Dan Repich, Austin, both of Tex.

[73] Assignee: National Instruments Corporation, Austin, Tex.

[21] Appl. No.: 08/979,589

[22] Filed: Nov. 26, 1997

[51] Int. Cl.[7] .............................. G06F 12/00; G06F 13/28
[52] U.S. Cl. ................................................ 710/56; 710/22
[58] Field of Search .................................. 710/22, 52–56; 709/236, 250; 711/156

[56] References Cited

U.S. PATENT DOCUMENTS 5,828,901  10/1998  O'Toole et al. ............................ 710/22

*Primary Examiner*—John A. Follansbee
*Attorney, Agent, or Firm*—Conley, Rose & Tayon; Jeffrey C. Hood

[57] ABSTRACT

A system and method for dynamically re-programming the acquisition cycle of a video acquisition system. The video acquisition system comprises a host computer and a video source. The host computer comprises a CPU, a system memory, and a video capture board. The video capture board receives a video signal from the video source. The video signal comprises a sequence of frames. The video capture board includes a DMA Controller which writes video frames to system memory under the control of a circularly linked list of commands. The linked list contains a plurality of sublists, each of which schedules the DMA transfer of a video frame to a corresponding video buffer in system memory. By removing a sublist from the linked list, a video buffer is removed from the set of buffers targeted for data transfer by the DMA Controller. By adding a sublist to the linked list, a video buffer is restored to the targeted set. A current or recently completed video buffer is removed from the targeted set in response to a request asserted by an application program.

19 Claims, 17 Drawing Sheets

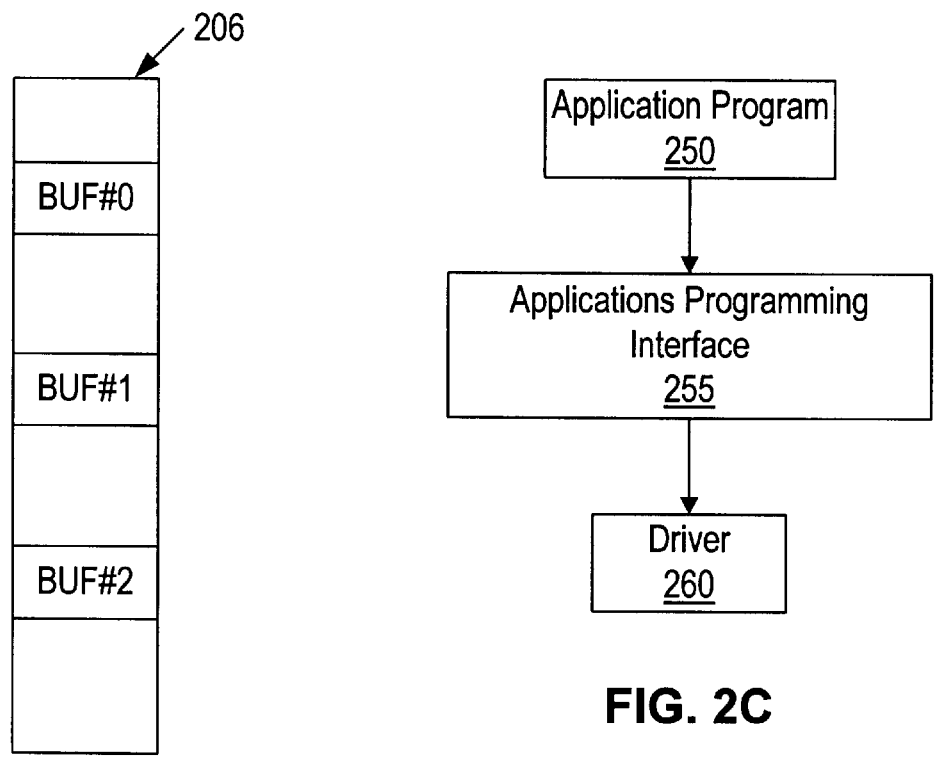
FIG. 2C
FIG. 2B
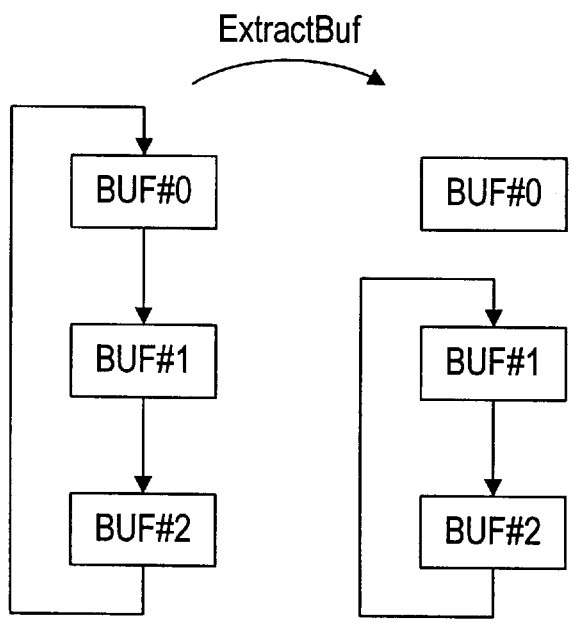
Effect of ExtractBuf Function
FIG. 2D

ReleaseBuf

Top-Level Flowchart for CPU Processing

Typical Scenario

DMA Control List

Processing Loop for the DMA Controller 320

Sublist Removal by Function ExtractBuf

Special Case Extraction when DMA Control List Contains Only one Sublist

ExtractBuf Function

Extraction of Current Buffer

Extraction of Last Buffer

SYSTEM AND METHOD FOR EXTRACTING AND RESTORING A VIDEO BUFFER FROM/ TO A VIDEO ACQUISITION CYCLE

FIELD OF THE INVENTION

The present invention relates to the field of video acquisition, and in particular to a system and method for extracting and restoring a video buffer from/to a video acquisition cycle.

DESCRIPTION OF RELATED ART

The field of video acquisition has grown tremendously in recent years in response to improvements in fundamental device technologies. A typical video acquisition scenario involves a host computer and a video source device. The host computer includes a CPU, system memory, and a video capture board. The video source device provides an analog or digital video signal to the video capture board via a video bus. Typical video sources include industrial cameras, camcorders, video cameras, VCRs, TV tuners, and laserdisk players. The video signal comprises a stream of video frames. The video capture board is designed to transfer video frames from the source video stream to a collection of video buffers residing in system memory. Each video buffer has the capacity to store one video frame. Since system memory also serves as the locus of storage for code and non-video data, the number of video buffers allocated in system memory is limited. Let N represent the number of video buffers targeted by the video capture board. Typically, the video capture board is configured to transfer video frames to the video buffers in a cyclic fashion. Thus, the collection of N video buffers are referred to as a video buffer Ring. The video buffer that has most recently been filled (i.e. written to) by the video capture board is called the last buffer. The video buffer that is currently being written to by the video capture board is called the current buffer.

Let T be the frame period of the video signal, i.e. the time between successive frames. Once the video capture board finishes writing to a given video buffer, the video buffer will be written again in $(N-1) \times T$ seconds, assuming that the video capture board acquires video frames into the video buffer Ring in real-time.

The CPU typically performs an image processing or display task under the control of an application program stored in system memory. Typical image processing tasks include filtering, particle counting, morphology, edge detection, Fourier transformation, and motion detection. In order to perform the image processing task, the application program must repeatedly access video frames for processing. Thus, prior art video processing systems typically includes a software function, callable by the application program, which provides access to the most recently acquired video frame, i.e. the contents of the last buffer. When the application program gains access to the last video buffer, it has $(N-1) \times T$ seconds to complete its processing/analysis before the buffer is overwritten by the video capture board. Note that the factor $(N-1)$ is due to the fact that application program can assert its request for the last buffer anytime during the time-interval of the current buffer. Thus $(N-1) \times T$ is a conservative estimate for the time until overwrite. In view of this fact, the designer of the application program must be careful to estimate the maximum expected time Tmax for processing a video buffer. Then the number N of video buffers allocated in system memory must be chosen large enough so that $$Tmax < (N-2) \times T$$

The drawback to this approach is that image processing tasks are often time intensive: so Tmax is generally large, and the number N must be correspondingly large to obey the above inequality. Thus, system memory is significantly depleted to accommodate a large number of video buffers.

Other prior art video processing systems alleviate this problem of memory depletion as follows: when the application program asserts a request for the last video buffer, the last buffer is copied to a reserved buffer outside the video buffer Ring. This requires extra CPU activity but purchases data integrity. Since, the reserved buffer is not targeted by the video capture board, the application program is free to process the data in the reserved buffer as long as necessary.

In summary, prior art systems are forced into a choice of overhead data movement or depleted system memory capacity, because the write-cycle of the video capture board is inflexible: i.e. the same set of video buffers are always targeted by the video capture board. Thus, a system and method are needed whereby the write-cycle of the video capture board may be dynamically reprogrammed to exclude a requested video buffer.

SUMMARY

The present invention comprises an improved system and method for dynamically re-programming the acquisition-cycle of a video acquisition system. The video acquisition system comprises a host computer and a video source device. The host computer comprises a CPU, system memory, and a video capture board. The video source device provides an analog or digital video signal to the video capture board via a video bus. The video signal comprises a stream of video frames. For example, a video signal conforming to the RS-170 format provides 30 monochrome video frames per second, while the CCIR format provides 25 frames per second. The video capture board is configured to acquire and transfer video frames to system memory in real-time. A set of N video buffers are allocated in system memory and serve as possible targets of data transfer from the video capture board. Each video buffer has sufficient capacity to store one video frame. According to the present invention, the video capture board includes a DMA Controller which is governed by a circularly linked list of commands stored in system memory. The linked list is initially configured with a plurality of sublists which are in one-to-one correspondence with the N video buffers originally allocated in system memory. Each sublist contains one or more commands which schedule the DMA transfer of a video frame to the corresponding video buffer. The DMA Controller sequentially steps through the linked list performing the data transfer operations indicated by each sublist. Thus, the DMA Controller transfers video frames to a target set of video buffers in system memory in a cyclic fashion. Initially all N video buffers are in the target set, since the linked list initially includes N sublists, one for each video buffer.

According to the method of the present invention, a selected video buffer can be removed from the target set of video buffers by removing the corresponding sublist from the linked list of commands. In particular, when an application program asserts a request for the most recently completed video buffer, the host computer reads the so-called Buffer Index Register on the video capture board, and is thereby provided with the index of the most recently completed (i.e. filled) video buffer in system memory. This index also specifies the sublist which is to be removed. The host computer then determines the sublists which immediately precede and follow the sublist to be removed. The host computer links the tail of the preceding sublist to the head of the following sublist, and in this fashion the requested sublist is removed and the corresponding video buffer is removed from the target set of the DMA Controller. To facilitate the linking process, the host computer maintains a doubly linked data structure (distinct from the linked command list mentioned above) which stores for each sublist a collection of data items including the following: (1) the address of the first node of the sublist; (2) a pointer which locates the next pointer field of the last node of the sublist; (3) a flag which indicates whether or not the sublist has been removed from the linked command list. By accessing this data structure, the host computer is able to perform the sublist removal in real-time.

Since the removed buffer is no longer targeted for data transfer by the DMA Controller, the application program is free to process the removed buffer as long as necessary. While the application program is processing the removed buffer, the DMA Controller, under the control of the modified command list, is able to acquire each frame of the source video sequence into the remaining buffers in system memory, i.e. the buffers that have not been removed Thus, the video acquisition system of the present invention solves the problem associated with the non-deterministic nature of video processing. A video processing task can take as long as necessary to process a removed video buffer without inhibiting the real-time acquisition of video frames into into system memory.

In addition to the last buffer, the application program may assert a request for the current buffer (i.e. the video buffer which is being currently written by the video capture board). In this case, the method of the present invention waits until the current buffer is completed, and then removes the corresponding sublist from the linked list.

The application program may repeatedly assert requests for current or last video buffers (current or last is defined with respect to the moment the request is asserted) to remove these buffers from the target set of video buffers. For each such request, the method of the present invention removes the requested video buffer from the target set of the DMA Controller by removing the corresponding sublist from the linked list. Eventually the system may be reduced to the state of having only one video buffer in the target set and one sublist in the linked list. In this case, every video frame of the source video stream is written to this one video buffer. A subsequent request for a video buffer will remove the sole sublist from the linked list and video acquisition terminates.

When the application program has finished processing/analyzing a video buffer, the method of present invention provides a function which restores the video buffer to the target set of the DMA Controller. In particular, the sublist corresponding to the video buffer is re-inserted into the linked list. After the re-insertion, the video buffer will regularly receive video data as part of the DMA write-cycle.

Thus, the number of video buffers in the target set (and correspondingly the number of sublists in the linked list) decreases by one as the application programs asserts requests to "hold a video buffer". Also, the number of video buffers in the target set increases by one as the application program "releases a video buffer". Thus, the computer system can selectively remove and add video buffers from/to the target set of video buffers for processing without requiring copying of the associated video data to a new memory area.

BRIEF DESCRIPTION OF THE DRAWINGS

Other objects and advantages of the invention will become apparent upon reading the following detailed description and upon reference to the accompanying drawings in which:

FIG. 2B is an illustration of three video buffers in system memory 206;

FIG. 2C is a hierarchical diagram of the software executed by CPU 202 according to the present invention;

FIG. 2D illustrates the effect of a call to the ExtractBuf function according to the present invention;

Figure 1:
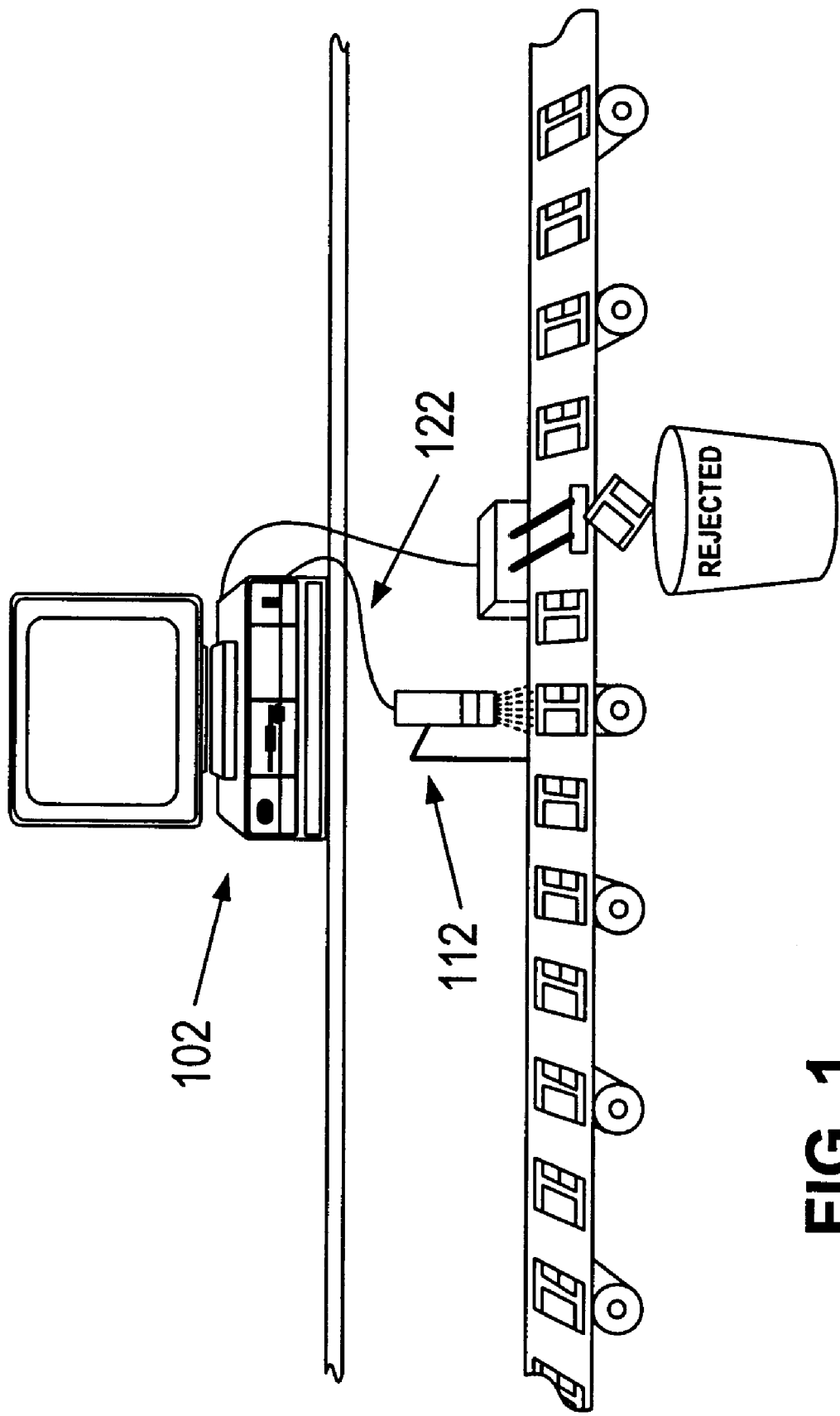
FIG. 1 is an illustration of the video capture system of the present invention.

While the invention is susceptible to various modifications an alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Referring now to FIG. 1, an illustration of the video capture system of the present invention is provided. The video capture system comprises a video source 112 coupled to a host computer 102 via a video bus 122. Typical video sources include industrial cameras, camcorders, video cameras, VCRs, TV tuners, and laserdisk players. The video source 112 provides an analog or digital video signal to the host computer via video bus 122. The video signal comprises a stream of video frames. The host computer stores and/or processes the stream of video frames. Typical processing tasks include filtering, particle counting, morphology, edge detection, Fourier transformation, and motion detection.

Figure 2A:
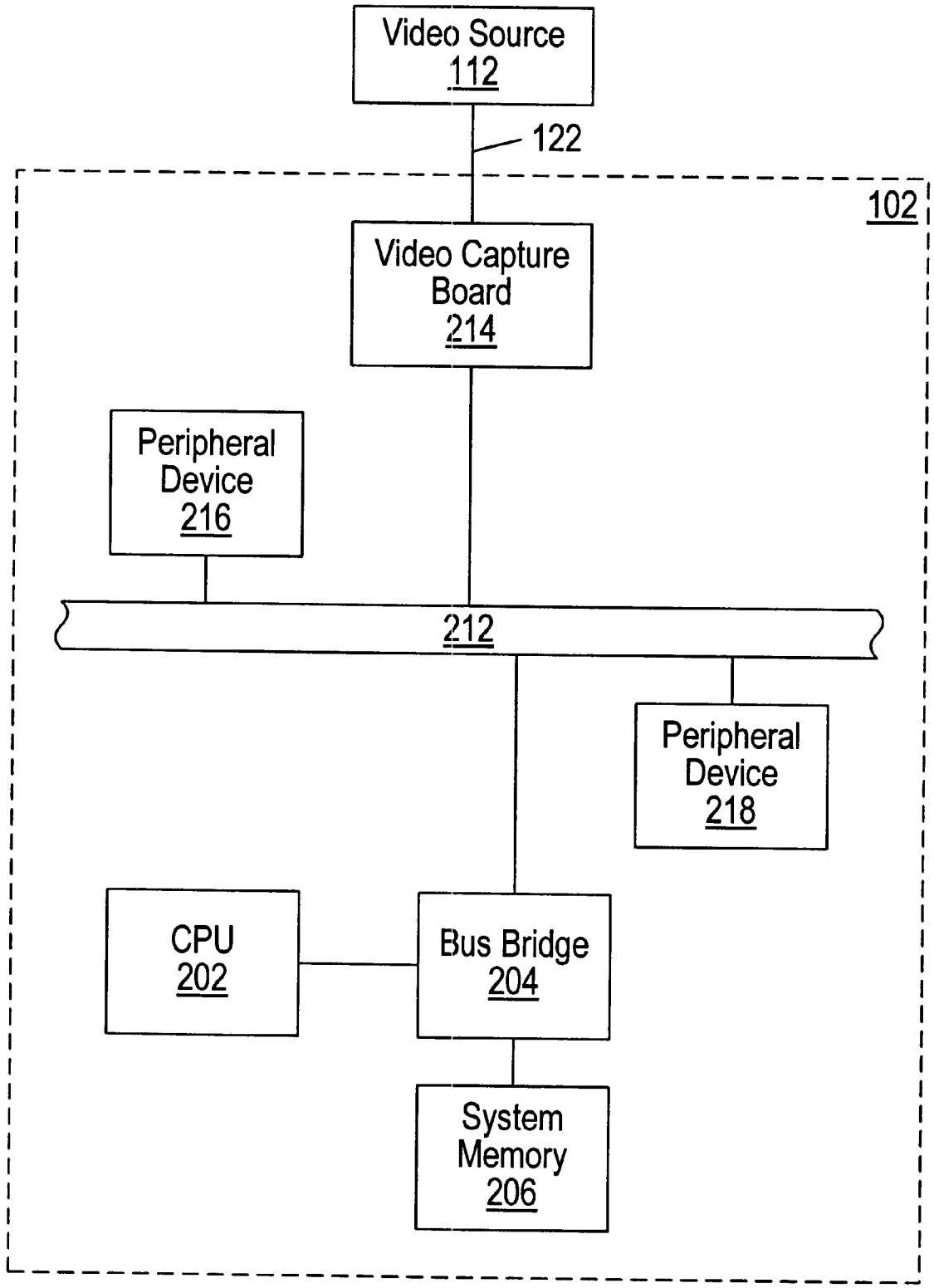
FIG. 2A is a high-level block diagram of the video capture system of the present invention.

Referring now to FIG. 2A, a high-level block diagram of the video capture system of the present invention is presented. The host computer 102 comprises a CPU 202 coupled to system memory 206 via a bus bridge 204. The host computer 102 further comprises a video capture board 214 coupled to bus bridge 204 via a peripheral bus 212. In the preferred embodiment of the invention the peripheral bus 212 comprises a PCI expansion bus. However, it is noted that peripheral bus 212 may be realized by other types of interconnecting bus. The video capture board 214 receives the video signal from the video source 112 via the video bus 122. The video capture board 214 is responsible for acquiring and transferring the stream of video frames into system memory 206 via the peripheral bus 212. The video capture board 214 is a bus master, capable of assuming control of data transfer over peripheral bus 212.

In addition to the video capture board 214, other peripheral devices (216 and 218) are coupled to the peripheral bus 212, such as audio cards, modems, graphics cards, and network cards. In general, each of the other peripheral devices (216 and 218) engages the peripheral bus 212 in a pseudo-random fashion. From the point of view of the video capture board 214, the available transfer bandwidth on the peripheral bus 212 is constantly fluctuating. [Available transfer bandwidth is defined as the maximum transfer bandwidth attainable minus bandwidth consumed by other peripheral devices.]

A collection of video buffers is initially allocated in system memory 206 to serve as a target for the video frames acquired by video capture board 214. Please refer now to FIG. 2B which illustrates a collection of three video buffers in system memory 206. The video capture board 214 is initially configured to cyclically overwrite the video buffers with acquired video frames (i.e. one frame per buffer). Thus, the video buffers receive video frames in the order BUF#0, BUF#1, BUF#2, BUF#0, BUF#1, BUF#2, and so on. Each video buffer comprises sufficient storage for a single video frame. In the following discussion, the terms last buffer and current buffer will be used repeatedly. The current buffer is the video buffer which is currently receiving video data from the video capture board 214. The last buffer is the video buffer which has been most recently filled by the video capture board, or in other words, the video buffer which precedes the current buffer in the buffer write-cycle.

The CPU 202 processes the video frames stored in system memory 206 under the direction of software also stored in system memory 206. Referring now to FIG. 2C, a hierarchical diagram of the software executed by CPU 202 is shown. An application program 250, written in a high-level programming language, comprises the top level of the hierarchy. In the preferred embodiment of the invention, the application program 250 is written in the *LABVIEW graphical programming language by National Instruments*. The application program 250 comprises a set of instructions which specify an image processing task.

The intermediate level comprises an applications programming interface (API) 255. The API 255 includes a collection of routines, callable by the application program 250, which perform a variety of high-level control and configuration tasks associated with the video capture system. According to the present invention, the API 255 includes a function called ExtractBuf which allows the application program 250 to remove a video buffer from the buffer write-cycle. Please refer now to FIG. 2D which illustrates the effect of a call to the ExtractBuf function. The arrows in the diagram are meant to indicate the order in which video buffers are overwritten by the video capture board 214. On the left, the buffer write-cycle includes all three of the initially allocated video buffers: BUF#0, BUF#1, and BUF#2. The ExtractBuf function removes either the current buffer or the last buffer from the buffer write-cycle. Suppose that BUF#0 is the current buffer at the moment ExtractBuf is called with BufOption parameter set to CURRENT. Then, the ExtractBuf function alters the structure of the buffer write-cycle so that the current buffer, BUF#0, is no longer targeted. Henceforth the video capture board 214 writes video frames cyclically to BUF#1 and BUF#2, as shown on the right side of FIG. 2D. The ExtractBuf function returns the virtual memory address of the extracted buffer, and the index of the extracted buffer. Since BUF#0 has been extracted from the buffer write-cycle, the application program is free to process BUF#0 as long as necessary.

Figure 2E:
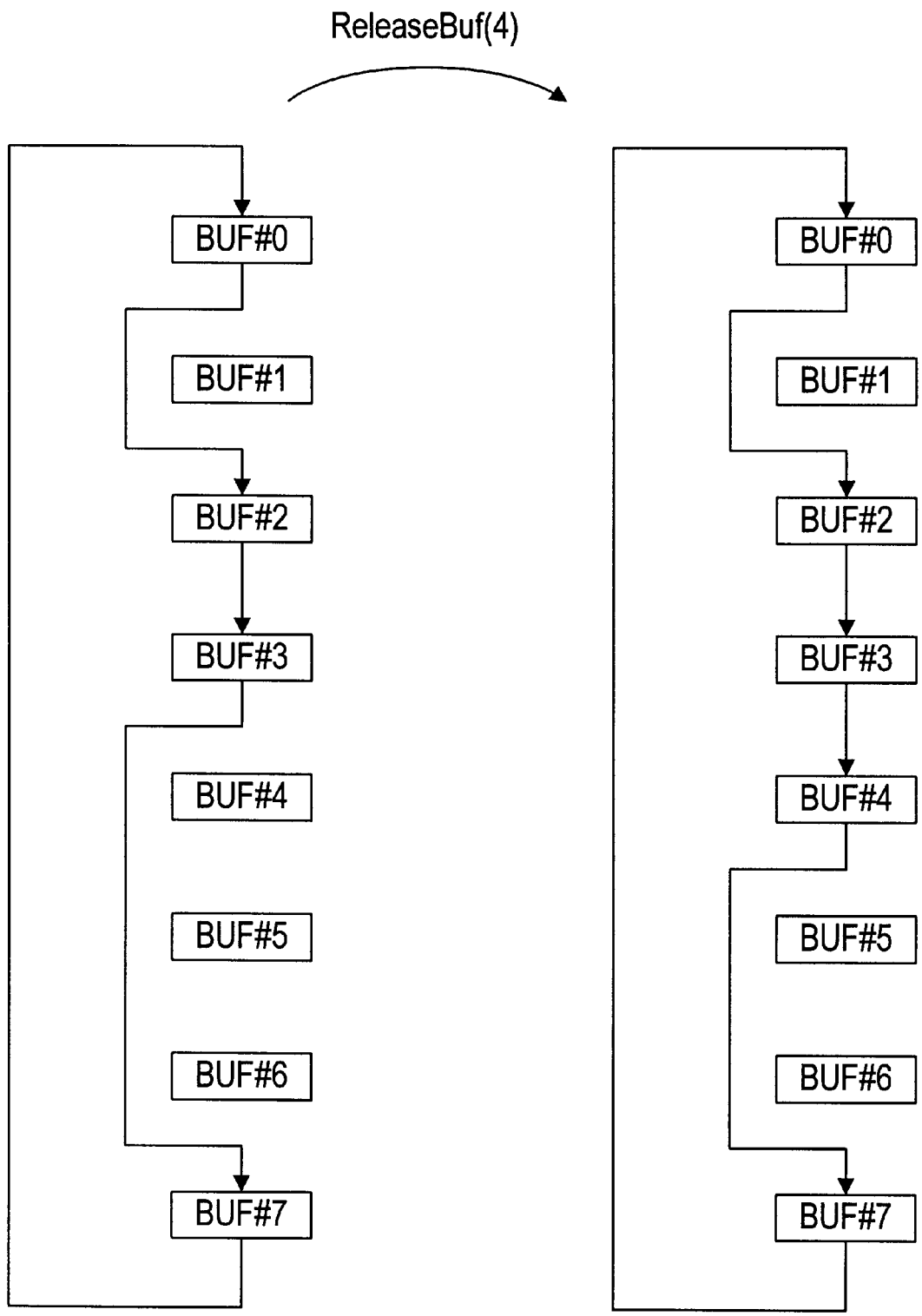
FIG. 2E illustrates the effect of the ReleaseBuf function.

According to the present invention, the API 255 also includes a ReleaseBuf function which allows the application program 250 to restore a buffer to the buffer write-cycle after it has been extracted with the ExtractBuf function. Please refer now to FIG. 2E which illustrates the effect of the ReleaseBuf function. On the left, the buffer write-cycle of the video capture board 214 is illustrated as it might appear after several calls to the ExtractBuf function. Of eight original video buffers (BUF#0 through BUF#7), only four remain in the buffer write-cycle: BUF#0, BUF#2, BUF#3, and BUF#7. Buffers which are part of the write-cycle are said to be active; the others are said to be inactive. The function ReleaseBuf receives an index of the video buffer to be restored to the write-cycle. Suppose that the application program 250 has finished processing inactive buffer BUF#4. Then, by calling the ReleaseBuf function with BufIndex=4, BUF#4 is restored to the write-cycle as illustrated on the right side of FIG. 2E.

Please refer once again to FIG. 2C. The bottom level of the software hierarchy comprises the driver 260. The driver 260 includes a host of low-level routines for controlling and configuring the video capture system. Functions in the API 255 end up calling the driver routines to accomplish hardware oriented details.

Figure 3:
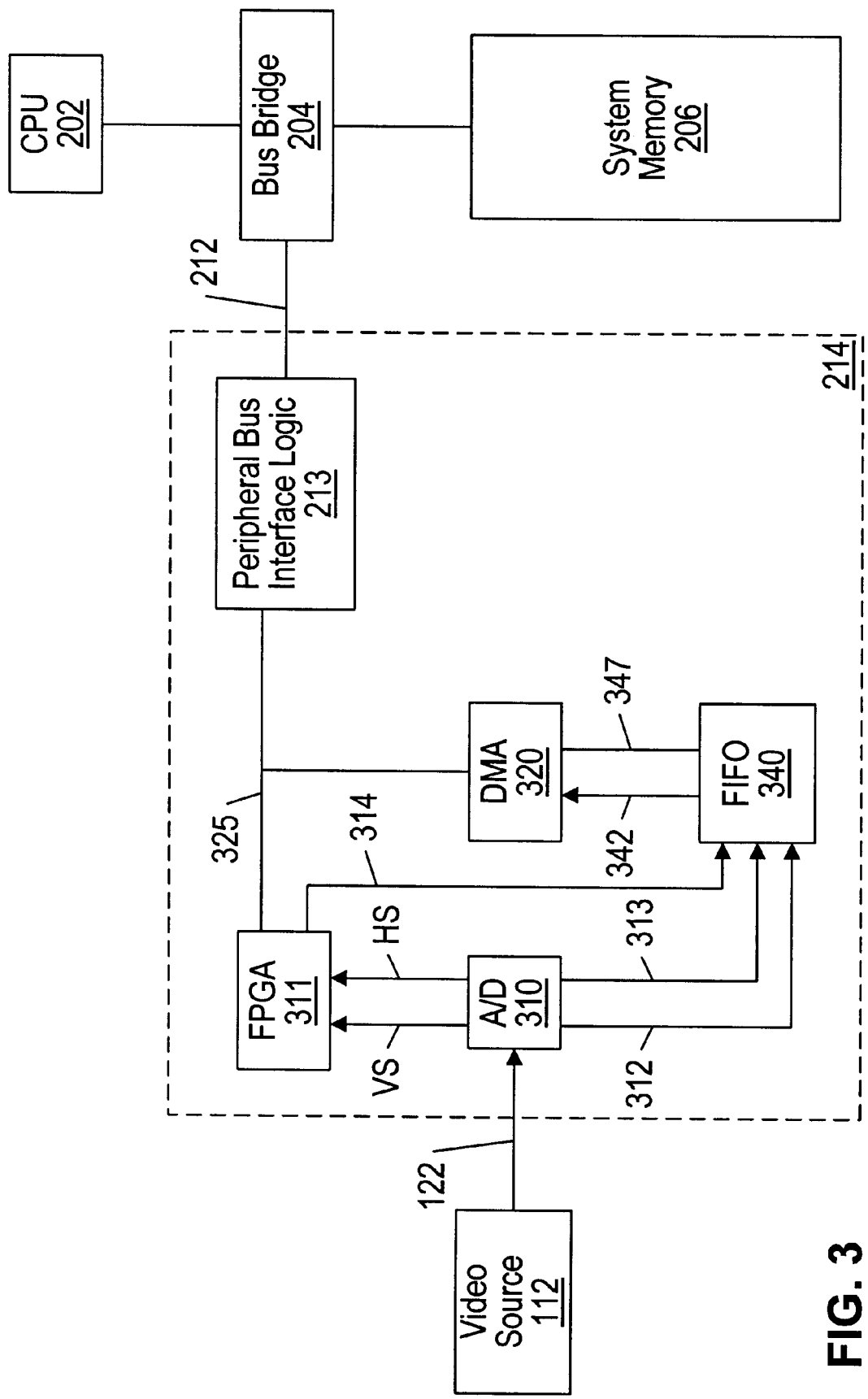
FIG. 3 illustrates a first embodiment of the video capture board 214 according to the present invention.

Referring now to FIG. 3, a first embodiment of the video capture board 214 according to the present invention is depicted. The video capture board 214 comprises an A/D converter 310 coupled to a Field Programmable Gate Array (FPGA) 311 via a VSYNCH line VS and an HSYNCH line HS; a First-In First-Out Buffer (FIFO) 340 coupled to the A/D Converter 310 via a write data bus 312, write strobe line 313, and coupled to the FPGA 311 via write enable line 314; a DMA Controller 320 coupled to FIFO 340 via read data bus 342 and handshaking lines 347; Peripheral Bus Interface Logic 213; and an internal bus 325 which couples the FPGA 311, the DMA Controller 320, and the Peripheral Bus Interface Logic 213.

The video capture board 214 receives an analog video signal from the video source 112 via video bus 122. The A/D Converter 310 receives the analog video signal and digitizes it continuously with a predetermined sample rate. [The sample rate is configured at system initialization for the type of video signal to be acquired.] Furthermore, the A/D Converter 310 continuously asserts the digitized video samples onto write data bus 312. However, FIFO 340 latches the digitized video samples (a) only when write enable line 314 is in the high (asserted) state, and (b) on the rising edge of write pulses conveyed on write strobe line 313.

The A/D Converter 310 separates the vertical and horizontal synch pulses from the analog video signal and provides these to the FPGA 311 via the VSYNCH and HYSNCH lines (VS and HS) respectively. By driving the write enable line 314, the FPGA 311 controls when digitized video samples are acquired by the FIFO 340. In particular, the FPGA 311 asserts the write enable line 314 (a) only for selected video frames, and (b) only during the information-bearing portions of the selected video frames. Thus, FPGA 311 uses the VSYNCH and HSYNCH lines (VS and HS) to disable the write enable line 314 during vertical and horizontal blanking periods. Also, during the vertical blanking period between the end of one frame and the beginning of the next frame, the FPGA 311 waits for a start enable signal to be asserted by the DMA Controller 320 via internal bus 325. The assertion of the start enable signal indicates that the next video frame is to be acquired (written into the FIFO 340). If the start enable signal is not asserted during this vertical blanking period, then the next video frame is not acquired, i.e. the write enable line 314 is disabled for the duration of the next video frame.

Furthermore, the FPGA 311 has an internal counter and thus is able to detect when the last pixel of a video frame is written into FIFO 340. When the last pixel of a video frame is written into FIFO 340, the FPGA 311 sends an Acquisition-Done (AcDone) Interrupt to CPU 202. The AcDone interrupt invokes an AcDone Interrupt Handler routine (part of the API 255) which sets a status flag AcDoneFlag in system memory 206. Thus, other routines running on CPU 202 are able to detect when a video frame has been acquired into FIFO 340 by polling the AcDoneFlag.

The FIFO 340 is read by the DMA Controller 320 is conjunction with read data bus 342 and handshaking lines 347. When the FIFO 340 is nonempty, it drives high (asserts) a read request signal via handshaking lines 347. In response to the read request signal, the DMA Controller 320 reads the FIFO 340 via read data bus 342 and handshaking lines 347. When the FIFO 340 becomes empty due to read activity by the DMA Controller 330, the FIFO drives low (de-asserts) the read request signal via handshaking lines 347. While the read request signal is de-asserted, the DMA Controller 330 does not read FIFO 340.

It is noted that the assertion of the read request signal does not necessarily imply that read accesses will be immediately performed by the DMA Controller 320. The DMA Controller 320 is limited by the availability of the peripheral bus 212; i.e. the DMA Controller 320 cannot sustain read accesses to the FIFO 340 when the peripheral bus 212 is unavailable (engaged by other peripheral devices 216 or 218).

The DMA Controller 320 is primarily responsible for transferring video frames from FIFO 340 to the video buffers in system memory 206 via Peripheral Bus Interface Logic 213. The DMA Controller 320 is governed by a linked list of commands stored in system memory 206. Hereinafter, this linked list of commands will be referred to as the DMA Control List. The DMA Control List is organized as a circularly linked collection of sublists. Each sublist schedules the transfer of a complete video frame from the FIFO 340 to one of the video buffers in system memory. Thus, the sublists of the DMA Control List determine which video buffers in system memory are targeted for video data transfer.

Figure 4A:
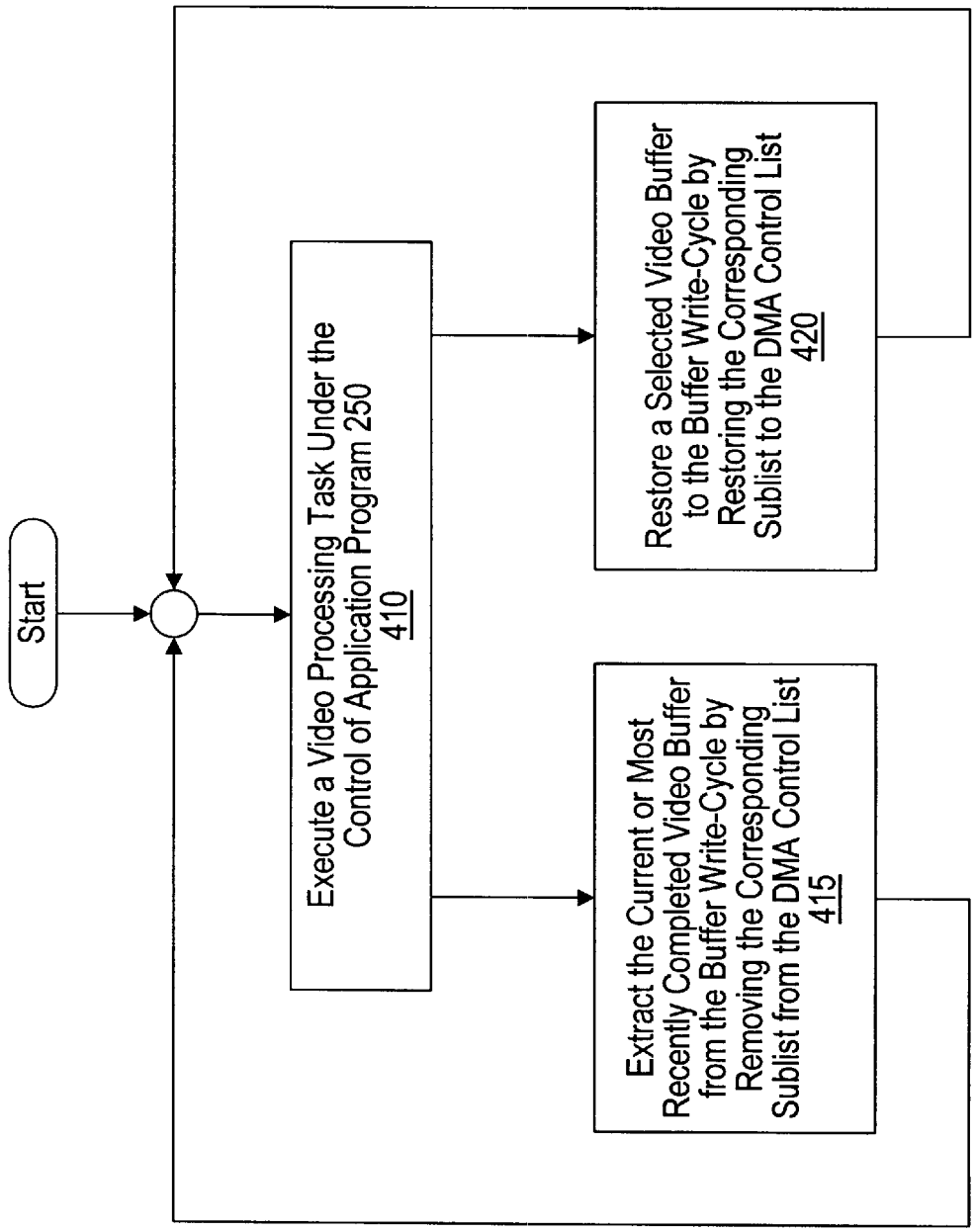
FIG. 4A presents a top-level flowchart for the processing activity of the CPU 202 according to the present invention.

Please refer now to FIG. 4A which presents a top-level flowchart for the processing activity of the CPU 202 according to the present invention. In step 410, the CPU 202 executes a video processing task under the control of application program 250. In step 410, the CPU 202 may also perform other processing tasks. According to the present invention, the CPU 202 has the option of extracting a buffer from the buffer write-cycle. In step 415, the CPU 202 extracts a video buffer from the buffer write-cycle by removing the corresponding sublist from the DMA Control List. In the preferred embodiment of the invention, the CPU 202 has options for extracting either the current buffer or the most recently completed buffer in the video buffer Ring. After having extracted a video buffer from the write-cycle, the CPU 202 is then free to process the extracted buffer as long as necessary, since the extracted buffer is no longer targeted for video data transfer by the video capture board 214. The CPU 202 may extract several buffers in succession. When the buffer write-cycle is reduced to one video buffer, a subsequent buffer extraction causes the video capture board to halt video data acquisition.

When the CPU 202 has finished processing one or more extracted video buffers, it has the option of restoring a buffer back into the buffer write cycle. In step 420, the CPU 202 restores a video buffer to the buffer write-cycle by restoring the corresponding sublist to the DMA Control List. In the preferred embodiment, the CPU 202 specifies an identifying index for the buffer to be restored. Thus, any one of the extracted video buffers may be restored to the buffer write-cycle. By repeatedly calling a buffer restoration program, the CPU 202 may restore several extracted buffers in succession and in any desired order.

In the preferred embodiment, the buffer extraction of step 415 is performed by the ExtractBuf function described above, and the buffer restoration of step 420 is performed by the ReleaseBuf function described above.

Figure 4B:
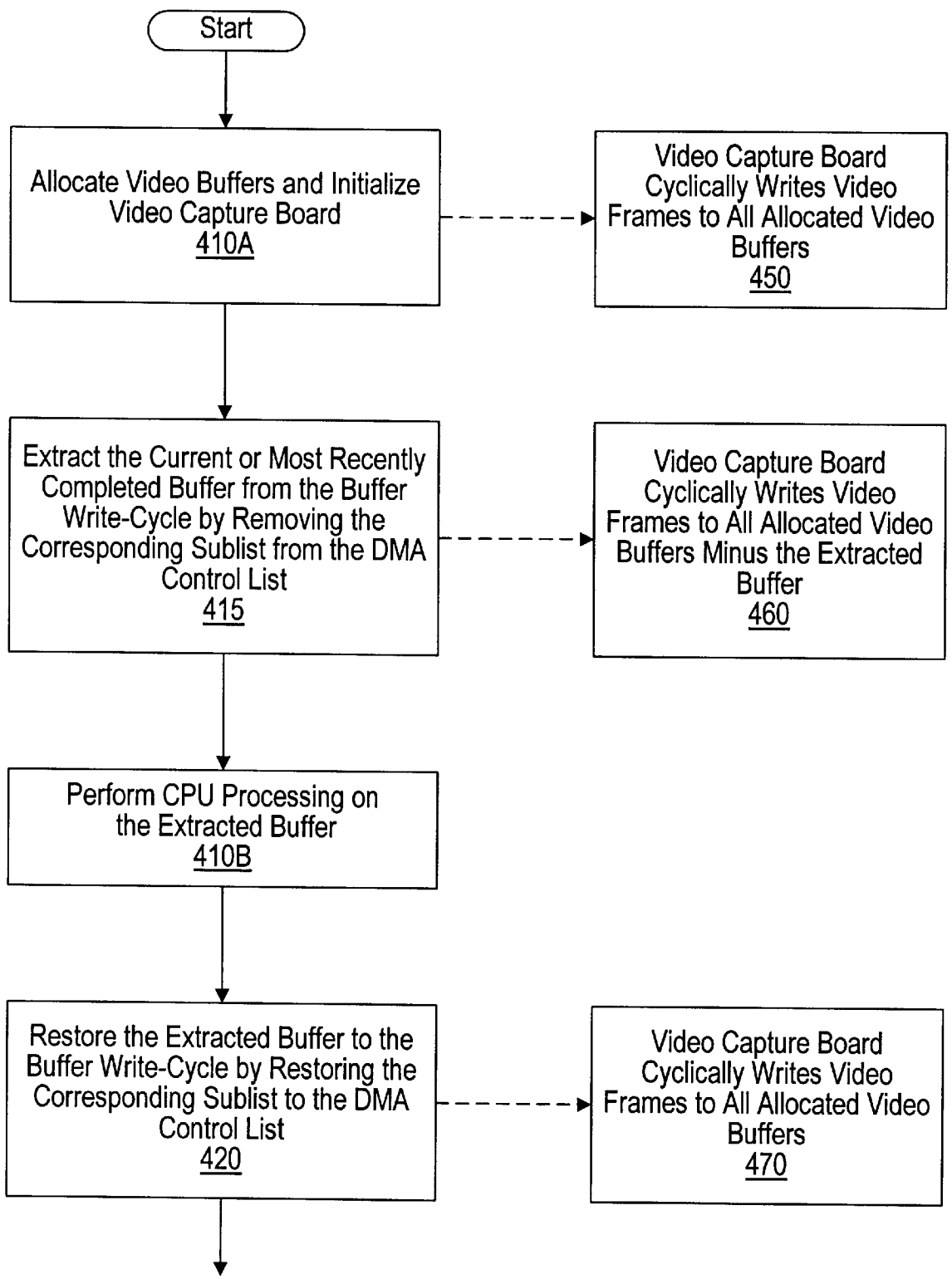
FIG. 4B illustrates a typical scenario, starting from system initialization, where the CPU 202 extracts and restores a buffer from the buffer write cycle.

Please refer now to FIG. 4B which illustrates a typical scenario, starting from system initialization, where the CPU 202 extracts and restores a buffer from the buffer write cycle. FIG. 4B also illustrates processing steps performed by the video capture board 214 in response to the processing steps executed by CPU 202. The processing steps on the left side of FIG. 4B are performed by CPU 202, whereas the processing steps on the right side of FIG. 4B are performed by video capture board 214. Step 410A comprises a portion of step 410 of FIG. 4A. In step 410A, the CPU 202 allocates a plurality of video buffers in system memory 206, initializes the video capture board 214, and generates the DMA Control List. In its initialization state, the DMA Control List includes one sublist for each of the allocated video buffers. Step 410A also includes starting the DMA Controller 320 with the first command of the DMA Control List. In response to step 410A, the video capture board cyclically writes video frames to all the allocated video buffers in system memory: this cyclic writing comprises step 450. In step 415, the CPU 202 extracts the current or most recently completed buffer from the buffer write-cycle by removing a corresponding sublist from the DMA Control List. In response to step 415, the video capture board 214 cyclically writes video frames to all allocated video buffers except for the extracted buffer: this comprises step 460.

Step 410B comprises a portion of step 410 of FIG. 4A. In step 410B, the CPU 202 performs processing on the extracted buffer. When the CPU 202 is finished processing the extracted buffer, step 420 is performed. In step 420, the CPU 202 restores the extracted buffer to the buffer write-cycle by restoring the corresponding sublist to the DMA Control List. In response to step 420, the video capture board 214 once again writes video frames cyclically to all allocated video buffers (step 470). After step 420, the CPU 202 performs further processing steps. It is noted that the CPU 202 is free to extract several buffers in succession. The single buffer extraction followed by buffer restoration illustrated in FIG. 4B is meant to demonstrate a typical buffer processing scenario.

The DMA Control List comprises a plurality of linked command structures called Nodes. A Node comprises a TransferCount field, a TransferAddress field, and a NextPtr field as follows:

```
typedef {   uInt32  TransferCount;
            uInt32  TransferAddress;
            uInt32  NextPtr;
        } Node;
``` where uIntN denotes the unsigned N-bit integer data type. A Node can be interpreted in three different ways depending on the value of the TransferCount field. However in all cases, the TransferAddress and NextPtr field contain physical addresses defining locations in system memory 206. The NextPtr field is used to point to the next Node of the DMA Control List.

If the TransferCount field takes a value in the range 0×1 through 0×FFFFFFFE, the Node is interpreted as a DMA transfer command. In this case, the DMA controller 320 transfers exactly TransferCount locations from the FIFO 340 to a destination in system memory 206 given by TransferAddress. Upon completion of the DMA operation, the first DMA controller 320 accesses the next node of the DMA Control List using the NextPtr.

If the TransferCount field takes the value 0×0, the DMA Controller 320 terminates processing. Thus, in this case the Node is interpreted as a STOP command.

If the TransferCount field takes the value 0×FFFFFFFF, the DMA Controller 320 accesses a data area located in system memory 206 at the address given by TransferAddress. The data area contains a sequence of address/data pairs concluded by a termination marker (0×FFFFFFFF). The addresses of the address/data pairs point to either locations in system memory 206 or registers in the video capture board 214. The DMA Controller 320 steps through the sequence of address/data pairs and transfers the data member of each pair to the location/register given by the address member of the pair. When the termination marker (0×FFFFFFFF) is reached, the DMA Controller 320 uses the NextPtr to access the next Node of the DMA Control List.

Thus, the Nodes of the DMA Control List have three different interpretations depending on the value of the TransferCount field. The Transfer Nodes define a DMA transfer operation to system memory 206. The STOP Nodes cause the first DMA Controller 320 to terminate processing. The Special Nodes with TransferCount field equal to 0×FFFFFFFF allow an arbitrary sequence of memory/register writes to be performed, and thus are of exceptional utility and flexibility.

The DMA Controller 320 transfers video frames from the FIFO 340 to the video buffers in system memory 206 under the control of the DMA Control List. The DMA Control List comprises circularly linked collection of sublists. Each sublist contains one or more Transfer Nodes and Special Nodes. Each sublist schedules the transfer of a video frames from the FIFO 340 to one of the video buffers in system memory 206. The order of the sublists in the DMA Control List determines the order in which the video buffers are written. Also, since the DMA Control List is circularly linked, the video buffers are cyclically overwritten. Thus, it is the DMA Control List which imposes a ring structure to the video buffers. Henceforth, the active video buffers which serve as a target for video frame transfer will be collectively called the video buffer Ring. As described above, the size of the video buffer Ring expands and contracts in response to calls to the functions ExtractBuf and ReleaseBuf.

Figure 5A:
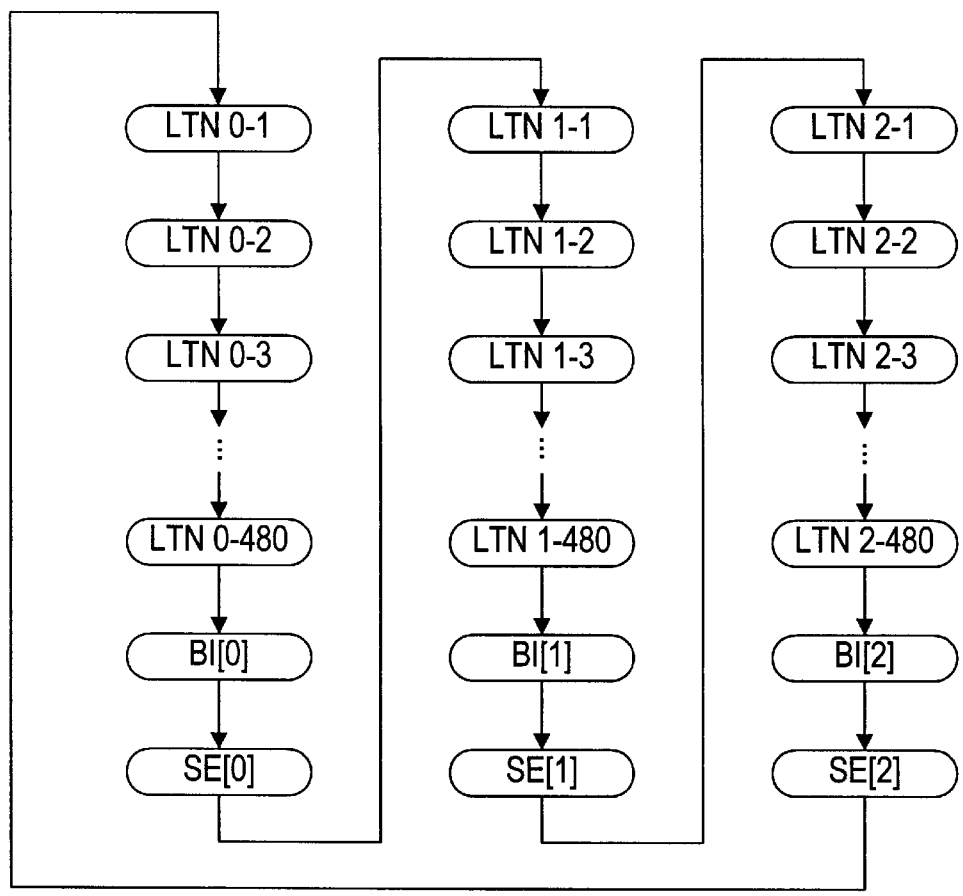
FIG. 5A is an illustration of a typical DMA Control List according to the present invention.

An illustration of a typical DMA Control List is provided in FIG. 5A. In this case, the DMA Control List is configured to implement a three buffer Ring in system memory 206 for an EIA RS-170 type video signal. The DMA Control List comprises three sublists, corresponding to the columns of FIG. 5A. Each sublist comprises a plurality of Transfer Nodes, and schedules the transfer of a single video frame from the FIFO 340 to one of the video buffers of the buffer Ring. For example, the first sublist, which occupies the first column of the DMA Control List, implements the transfer of a video frame to BUF#0 of the video buffer Ring (see FIG. 5B). Since a video frame for the RS-170 video signal comprises 480 scan lines, each sublist comprises 480 Transfer Nodes. Each Transfer Node schedules the transfer for a single line of a video frame. For this reason, in FIG. 5A, the Transfer Nodes are referred to as Line Transfer Nodes (LTN). In the RS-170 signal, a scan line comprises 640 pixels. Thus, the TransferCount field for each Line Transfer Node takes the value 640. It is noted that this line-oriented organization for the DMA Control List allows lines from the odd and even fields to be reintegrated in order according to the physical image if desired.

Figure 5B:
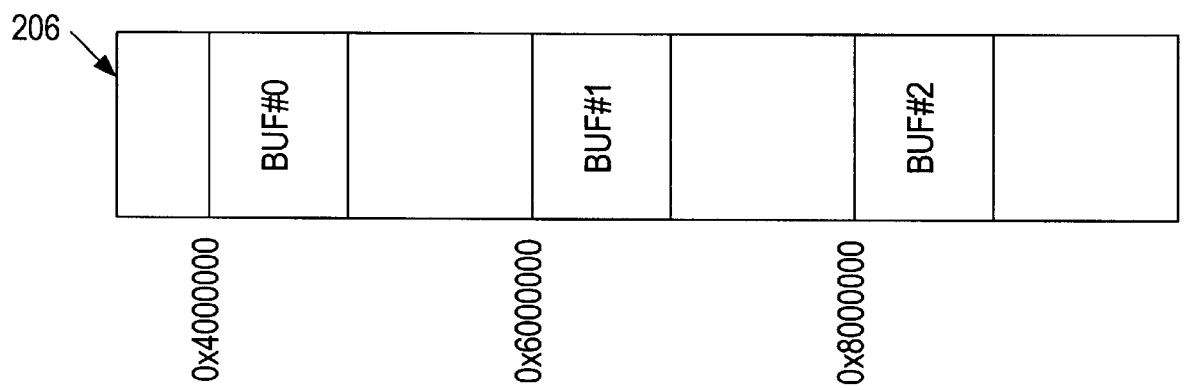
FIG. 5B is an illustration of three video buffers which comprise a video buffer Ring in system memory 206 according to the present invention.

In FIG. 5B, an illustration of the three buffer Ring in system memory 206 is shown. The three video buffers, BUF#0, BUF#1, and BUF#2 are illustrated as contiguous blocks of physical memory for convenience only. The three video buffers are shown with starting addresses 0×4000000, 0×6000000, 0×8000000. The Line Transfer Nodes of FIG. 5A are indexed with two integers: LTN I-J. The first integer I denotes the destination buffer number, and the second integer J denotes the line number of a video frame being transferred. Thus, for example, the Line Transfer Nodes LTN 1-J have TransferAddress fields pointing into BUF# 1. And Line Transfer Node LTN 1-1 has TransferAddress field equal to the starting address of BUF#1, i.e. 0×6000000.

Furthermore, each sublist is concluded by two Special Nodes labelled BI[Index] and SE[Index]. Recall that a Special Node is distinguished in that its TransferCount field takes the value 0×FFFFFFFF. The Special Nodes BI[Index] are used to signal the completion of a frame transfer to a corresponding video buffer. For example, the Special Node BI[0] is used to signal that a complete video frame has been transferred to BUF#0 in the video buffer Ring. The Special Nodes SE[I] are used to assert the start enable signal, which is needed to enable acquisition of the next video frame.

Let I be the index of an arbitrary video buffer BUF#I in the video buffer Ring. After the DMA Controller 320 has finished processing the 480 Line Transfer Nodes LTN I-J which target BUF#I, a complete video frame will have been transferred from the FIFO 311 to BUF#I. In the FPGA 311, a register is reserved for storing the index of the most recently completed video buffer in the buffer Ring. Hereinafter, this register will be called the Buffer Index Register (BIR). The Special Node denoted as BI[I], which follows the 480 Line Transfer Nodes LTN I-J, is used to write the Buffer Index Register with the integer I. The configuration of Special Nodes BI[I] is illustrated by the following pseudo-code fragment.

```
typedef{  uInt32  address;
          uInt32  data;
        } pair;
pair *PairPtr;
Node BI[N];
for ( I=0; I<N; I++)
{
   BI[I].TransferCount = 0xFFFFFFFF;
   PairPtr = (pair *) malloc( 2*sizeof(pair) );
   BI[I]. TransferAddress = PhysicalAddr(PairPtr);
   PairPtr->address = BIR;
   PairPtr->data = I;
   PairPtr++;
   PairPtr->address = 0xFFFFFFFF;
   ;
}
```

First, a data type called pair is defined which includes an address member and a data member. The address member is an unsigned 24-bit integer, and the data member is an unsigned 8-bit integer. A pointer PairPtr to type pair is defined. An array called BI is defined: the array comprises N elements of type Node defined above, where N is the number of video buffers originally allocated in system memory 206. Next a loop is performed which configures each of the Nodes BI[I]. For each value of index I from 0 to N-1, the following steps are performed.

(A) The TransferCount field of Node BI[I] is set to the value 0xFFFFFFFF, thus defining Node BI[I] to be a Special Node.

(B) A block of contiguous memory is allocated. The memory block has size equal to two objects of type pair. The starting address of the memory block is assigned to the pointer PairPtr.

(C) The starting address of the memory block is also assigned to the TransferAddress field of the Node BI[I].

(D) The memory block is loaded with a first object of type pair: the address member is assigned the address of the Buffer Index Register of the FPGA 311; the data member is assigned the value of index I.

(E) The memory block is loaded with a second object of type pair: the address member is assigned the value 0xFFFFFFFF, and the data member is assigned the value 0xFFFFFFFF. This second pair serves as a termination marker for the DMA Controller 320.

As mentioned above, a video frame is selected for acquisition into the FIFO 340 by means of a start enable signal asserted by the DMA Controller 320. The DMA Controller 320 must assert the start enable signal during the vertical blanking period which precedes a video frame, if the video frame is to be acquired. To assert the start enable signal, DMA Controller 320 writes the predefined integer value GO to the Start Enable Register (SER) in the FPGA 311. The Special Nodes SE[Index] are used to perform this register write. Again, let I be the index of an arbitrary video buffer BUF#I in the video buffer Ring. Notice that the Special Node SE[I] is situated in the DMA Control List after all the Line Transfer Nodes LTN I-J. Thus, the DMA Controller 320 will transfer a complete video frame in response to the Line Transfer Nodes LYN I-J, and will execute Special Node SE[I] during the vertical blanking period which follows this completed video frame and precedes the next video frame.

So the FPGA 311 will receive the start enable signal in time for the next video frame to be acquired into FIFO 311, and the Line Transfer Nodes which follow Special Node SE[I] will have valid data to transfer from FIFO 311. The configuration of the Special Nodes SE[I] is illustrated by the follow pseudo-code fragement.

```
typedef{  uInt32  address;
          uInt32  data;
        } pair;
pair *PairPtr;
Node SE[N];
for ( I=0; I<N; I++)
{
   SE[I].TransferCount = 0xFFFFFFFF;
   PairPtr = (pair *) malloc( 2*sizeof(pair) );
   SE[I]. TransferAddress = PhysicalAddr(PairPtr);
   if (I)  SE[I-1].NextPtr = PhysicalAddr(SE[I]);
   PairPtr->address = SER;  /* SER=0x0500003C */
   PairPtr->data = GO;
   PairPtr++;
   PairPtr->address = 0xFFFFFFFF;
}
```

First, a data type called pair is defined which includes an address member and a data member. The address member is an unsigned 32-bit integer, and the data member is an unsigned 8-bit integer. A pointer PairPtr to type pair is defined. An array called SE is defined: the array comprises N elements of type Node defined above, where N is the number of video buffers originally allocated in system memory 206. Next a loop is performed which configures each of the Nodes SE[I]. For each value of index I from 0 to N-1, the following steps are performed.

(A) The TransferCount field of Node SE[I] is set to the value 0xFFFFFFFF, thus defining Node BI[I] to be a Special Node.

(B) A block of contiguous memory is allocated. The memory block has size equal to two objects of type pair. The starting virtual address of the memory block is assigned to the pointer PairPtr.

(C) The starting physical address of the memory block is assigned to the TransferAddress field of the Node SE[I].

(D) The NextPtr field of previous node SE[I-1] is assigned the address of the present node SE[I], provided the index I is non-zero.

(E) The memory block is loaded with a first object of type pair: the address member is assigned the address of the Start Enable Register of the FPGA 311; it is noted that the address of the Start Enable Register is equal to 0x0500003C. During system operation, the DMA Controller uses this address to write to I/O port "x05" which designates the FPGA, and to location x3C of the FPGA which designates the Start Enable Register within the FPGA.

(F) the data member is assigned the integer value GO (equal to 0x1).

(G) The memory block is loaded with a second object of type pair: the address member is assigned the value 0xFFFFFFFF. This second pair serves as a termination marker for the DMA Controller 320.

The organization of the DMA Control List varies depending on the type of video signal and the type of acquisition mode (field mode or frame mode) requested by the application program 250. The DMA Control List is initially created by the API 255 in response to a RingCreate function called by the application program 250.

The DMA Controller 320 cycles through the DMA Control List performing the operations indicated by each member Node. When the DMA Controller 320 finishes the processing indicated by a current Node, it uses the NextPtr field of the current Node to access the next Node of the DMA Control List. The DMA Controller 320 includes two special registers called the Node Address Register (NAR) and the First Node Address Register (FNAR). The NAR contains the physical address (i.e. the system memory address) of the most recently accessed Node of the DMA Control List. Thus, the contents of the NAR constantly changes as the DMA Controller accesses successive Nodes of the DMA Control List. In order to initialize the DMA Controller 320 at a particular Node, the CPU 202 writes the physical address of the Node to the FNAR. The DMA Controller 320 will then start accessing and processing Nodes from the Node address contained in the FNAR. Normally, the FNAR contents do not change unless rewritten by CPU 202. At system initialization, the FNAR is loaded with the physical address of the first Node of the DMA Control List: in FIG. 5A, this corresponds to the address of Line Transfer Node LTN 0-1.

Figure 5C:
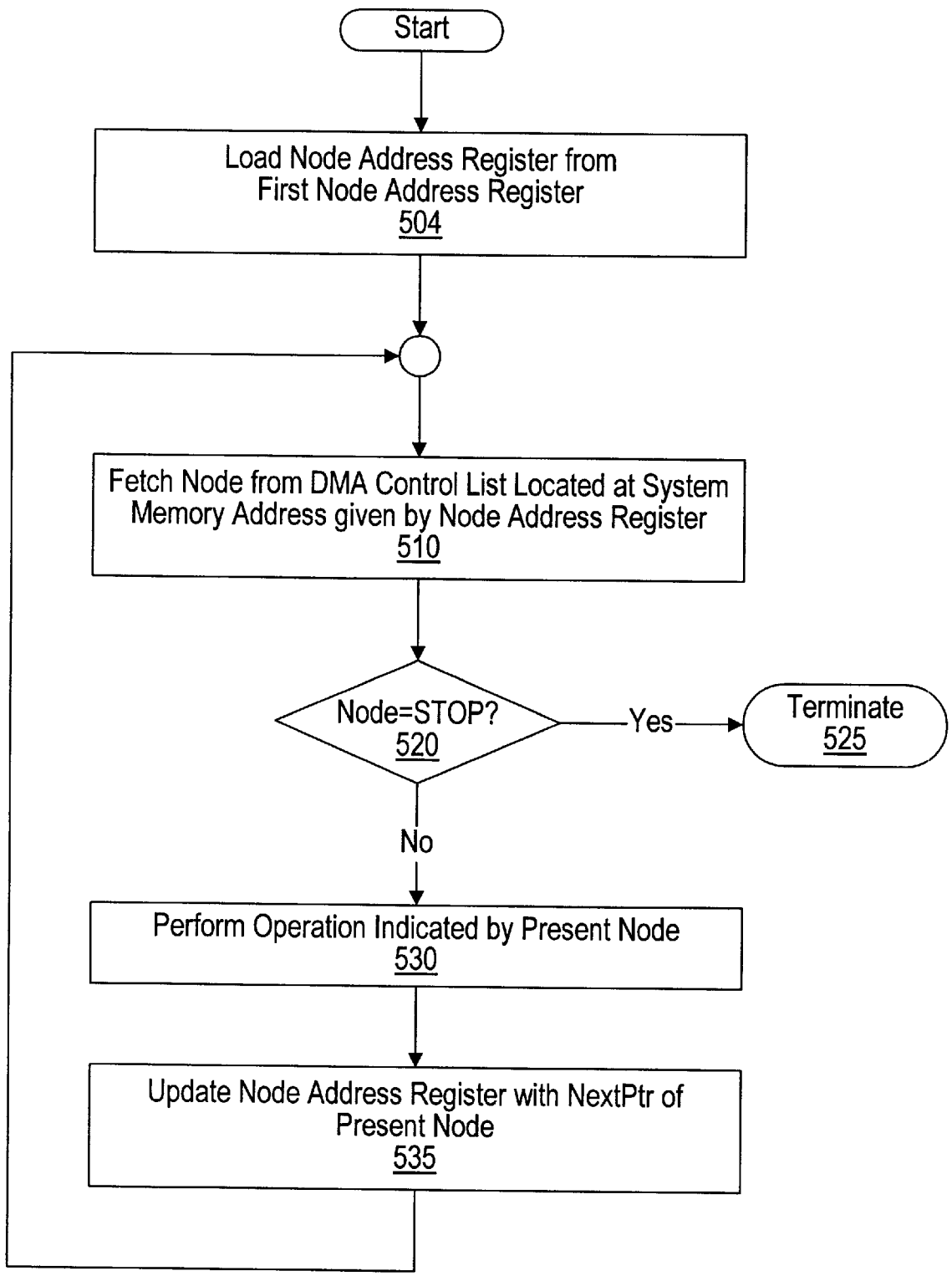
FIG. 5C is a flowchart of the processing loop for the DMA controller 320 according to the present invention.

Referring now to FIG. 5C, a flowchart of the processing loop for the DMA controller 320 is presented. The description of FIG. 5C is to be interpreted in conjunction with FIG. 5A which illustrates the DMA Control List. In step 504, the DMA Controller 320 loads the contents of the First Node Address Register into the Node Address Register. In step 510, the DMA Controller 320 fetches a Node from the DMA Control List located at the system memory address stored in the Node Address Register.

In step 520, a conditional branching is performed based on whether or not the Node is a STOP Command. The Node is identified to be a STOP Command if its TransferCount field equals 0x00000000. If the Node is a STOP Command, the first DMA Controller 320 terminates processing: the termination comprises step 525.

If, in step 520, the present Node is not a STOP Command, step 530 is performed. [The DMA Control List does not initially contain STOP Commands. However, the CPU 202 may alter the structure of the DMA Control List so as to include STOP Commands.]

In step 530, the DMA Controller 320 performs the operation indicated by the present Node, i.e. the Node that was fetched in step 510. As mentioned above in the description of the DMA Control List, if the TransferCount field of the Node takes a value in the range 0x1 through 0xFFFFFFFE, the Node is interpreted as a DMA transfer command. Thus, the DMA controller 320 transfers exactly TransferCount words from FIFO 340 to the destination is system memory 206 given by TransferAddress.

If the TransferCount field takes the value 0xFFFFFFFF, the Node is a Special Node. In the DMA Control List of the present invention, the Special Nodes assume the form of Special Nodes BI[I] or Special Nodes SE[I] described above. If the Special Node is of the form BI[I], the DMA Controller 320 writes the integer value I to the Buffer Index Register (BIR) in the FPGA 311. For example, if the Special Node is BI[1], the DMA Controller 320 writes the value 0x1 to the BIR. If the Special Node is of the form SE[I], the DMA Controller 320 writes the predefined integer value GO to the Start Enable Register (SER) in the FPGA 311, thus enabling FPGA 311 to acquire the next video frame.

In step 535, the Node Address Register is loaded with the value of the NextPtr field of the present Node. After step 535, the processing loop reiterates starting with step 504. Thus, the DMA Controller 320 repeatedly fetches and processes Nodes of the DMA Control List until a Stop Node is encountered, in which case the DMA Controller 320 terminates processing.

In order to start video acquisition, the application program 250 calls the function StartAcq of the API 255. The StartAcq function (a) writes the value 255 to the Buffer Index Register of the FPGA 311, (b) writes the address of the starting Node of the DMA Control List to the First Node Address Register of the DMA Controller 320, (c) sends a start enable signal to the FPGA (i.e. writes the integer value GO to the Start Enable Register of the FPGA 311), and (d) returns control to the application program 250. After the StartAcq function has completed, the DMA Controller 320 performs video acquisition under the control of the DMA Control List. The DMA Control List is dynamically reprogrammed by the functions ExtractBuf and ReleaseBuf.

It is noted that the number N of video buffers allocated in system memory 206 is significantly smaller than 255. When the DMA Controller 320 writes the Buffer Completion Register (of the FPGA 311) with the index of a completed video buffer, the index so written takes a value in the range 0 to N−1. Thus, the Buffer Index Register will contain the initialization value 255 [written in step (a) above] until the DMA Controller 320 finishes transferring the first video frame of the video sequence to system memory 206.

Now, the operation of the buffer extraction function ExtractBuf( ) will be explained in detail. As described above, the DMA Controller 320 transfers video frames from the frame acquisition buffer 340 to a video buffer Ring in system memory 206. (See FIG. 5B). The DMA Controller 320 writes successive video frames of the video sequence to the video buffer Ring in a cyclic fashion.

In order to extract a buffer from the video buffer Ring, the application program 250 (running on CPU 202) calls the function ExtractBuf The input and output parameters of the ExtractBuf function are illustrated by the following header:

ExtractBuffer(int BufOption, int WaitForNew, int BufNum, uint32 BufAddr);

The parameters BufOption and WaitForNew are input parameters, while the parameters BufNum and BufAddr are output parameters. The input parameter BufOption designates the extraction of either the current buffer or the last buffer. Thus BufOption takes either the value CURRENT or the value LAST. When the ExtractBuf function has completed the extraction of the buffer selected by BufOption, the index and virtual memory address of the extracted buffer are returned to the application program 250 via the parameters BufNum and BufAddr.

Figure 6:
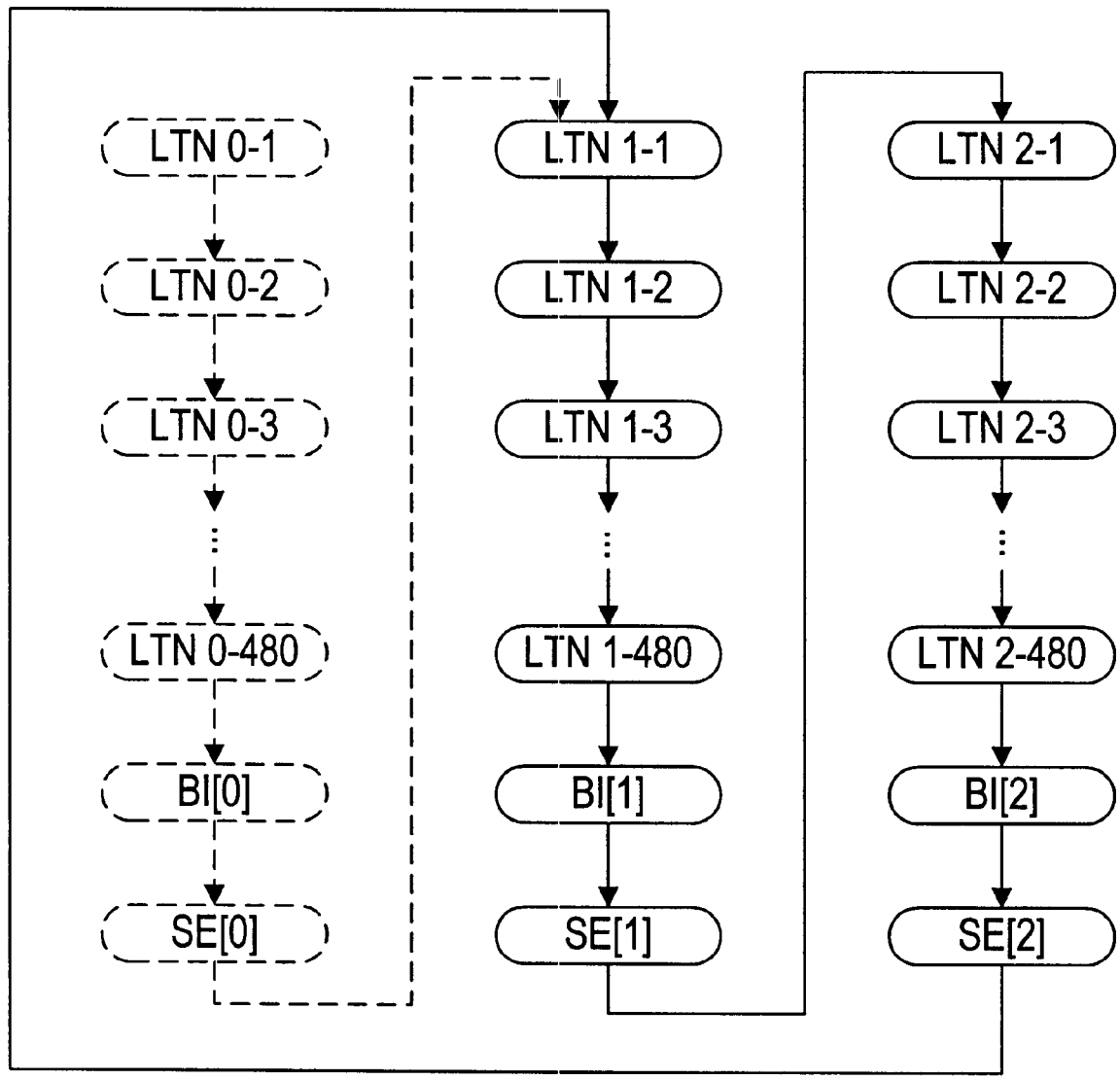
FIG. 6 illustrates the removal of a Sublist from the DMA Control List according to the present invention.

Suppose that the DMA Control List has the structure given in FIG. 5A. Thus, the DMA Control List contains three sublists (corresponding to the columns of FIG. 5A), each of which is responsible for scheduling the transfer of a video frame to a corresponding buffer in the video buffer Ring. For example, Sublist #1 is responsible for scheduling DMA transfer to BUF#1 of the video buffer Ring (see FIG. 5B). Suppose also that BUF#0 is the current buffer at the moment ExtractBuf is called by application program 250 with BufOption parameter equal to value CURRENT. In this case, the ExtractBuf function removes the current buffer, BUF#0, from the video buffer Ring by altering the structure of the DMA Control List as shown in FIG. 6. In particular, the ExtractBuf function removes Sublist #0 from the DMA Control List by writing the address of Line Transfer Node LTN 1-1 to the NextPtr field of Special Node SE[2]. Since Sublist#0 is no longer an active part of the DMA Control List, BUF#0 is no longer part of the video buffer Ring (i.e. is no longer targeted for video data by the DMA Controller 320). Now, the CPU 202 may safely process BUF#0 as long as necessary.

Figure 7:
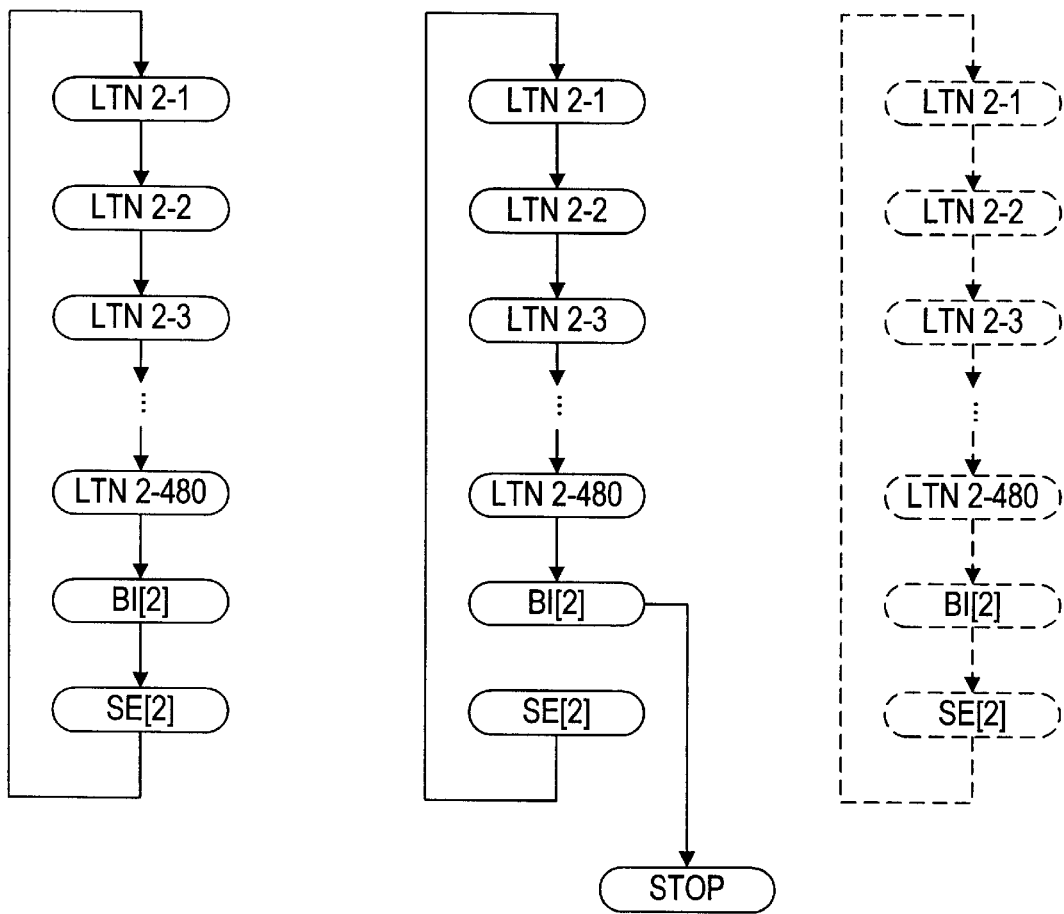
FIG. 7 illustrates the operation of the ExtractBuf function in the special case of a single active Sublist according to the present invention.

After several calls to the ExtractBuf function, the DMA Control List may be reduced to a single active Sublist. In this case, a call to the ExtractBuf function causes the DMA Controller 320 to terminate processing as soon as it has finished transferring the current video frame. Please refer now to FIG. 7 which illustrates the operation of the Extract-Buf function in this special case of a single active Sublist. On the left, the DMA Control List is shown as it appears at the time ExtractBuf is called. The DMA Control List contains a single active Sublist: namely, Sublist #2. Thus, the DMA Controller 320 writes every video frame of the source video sequence to BUF#2 in system memory 206. In order to terminate processing, the ExtractBuf function alters the NextPtr field of the Special Node BI[2] so that the NextPtr field points to a Stop Node (center of FIG. 7). After the alteration, the DMA Controller 320 will continuing processing the Nodes of Sublist #2 until the Stop Node is encountered. [Recall that a Stop Node causes the DMA Controller 320 to terminate processing.] By linking the Special Node BI[2] to a Stop Node, the ExtractBuf function ensures that the DMA Controller 320 (a) finishes the transfer of the current video frame and (b) updates the BIR with the completed buffer index (two in this case) before terminating. After the DMA Controller 320 has reached the Stop Node and terminated, the ExtractBuf function repairs the NextPtr field of Special Node BI[2] so that Sublist #2 will be in proper condition for later restoration by the ReleaseBuf function. In particular, the ExtractBuf function rewrites the address of Special Node SE[2] to the NextPtr field of Special Node BI[2]. The repaired (though still inactive) state of Sublist #2 is shown (in dotted lines) on the right of FIG. 7.

In view of the foregoing discussion, it is beneficial to have several addresses readily available for each of the originally defined video buffers and their corresponding Sublists (in the DMA Control List). The following psuedo-code illustrates the creation of a data structure called BufList which maintains a collection of crucial data for each of the originally defined video buffers.

```
typedef      { uInt32   BufferAddress;
               uInt32   BufferSize;
               uInt32   FirstNodeAddress;
               uInt32   *SE_NextPtr_Ptr;
               uInt32   *BI_NextPtr_Ptr;
               uInt32   SE_NodeAddress;
               int      Active;
             } BufEntry;
      BufEntry BufList[10];
```

The object BufList is defined as an array of type BufEntry. The size of the array (10) presupposes ten originally defined video buffers in system memory 206. Let I be an integer index with an arbitrary value in the range 0 through 9. The various fields of array element BufList[I] have the following interpretation. The BufferAddress field contains the virtual memory address of BUF#I in system memory 206. The BufferSize field contains the size of BUF#I in bytes. The FirstNodeAddress field stores the address of the Line Transfer Node LTN I-1 which heads Sublist #I of the DMA Control List. The field SE_NextPtr_Ptr is a pointer to the NextPtr member of Special Node SE[I]. The field BI_NextPtr_Ptr is a pointer to the NextPtr member of Special Node BI[I]. The field SE_NodeAddress contains the address of Special Node SE[I]. The field Active is a logical flag which indicates whether BUF#I is active or inactive, or equivalently, whether Sublist #I is an active part of the DMA Control List. The value true indicates active, and false inactive. When the video capture system is initialized, all the video buffers in system memory 206 are included in the video buffer Ring. Thus, every entry of the array BufList has its Active field initially set to the value true.

Figure 8:
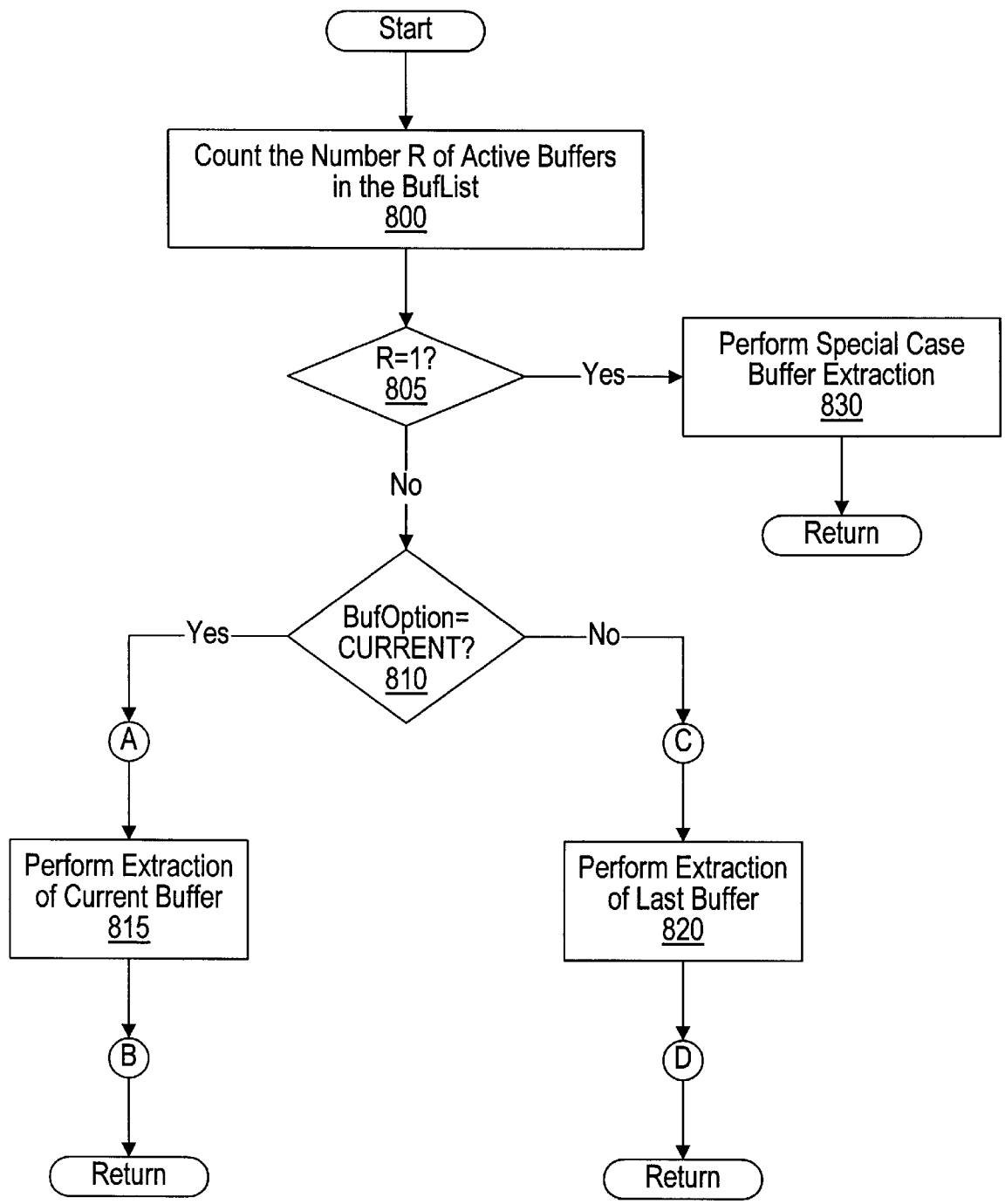
FIG. 8 is a high-level flowchart for the algorithm executed by the ExtractBuf function according to the present invention.

Please refer now to FIG. 8 for a high-level flowchart of the algorithm executed by the ExtractBuf function. In step 800, the ExtractBuf function counts the number R of active buffers in the BufList. The following psuedo-code fragment illustrates the counting process:

```
R=0;
while (i=0, i<N, i++)
  {
     if (BufList[i].Active == true) R++;
  };
```

A loop is employed to step through the elements of BufList. The integer N represents the size of BufList, or equivalently the total number of video buffers originally allocated in system memory 206. The integer R counts the number of entries of BufList with Active field set to true.

In step 805, the active buffer count R is tested. If R takes the value one, step 830 is immediately performed and then control returns to the application program 250. In step 830 the ExtractBuf performs the special case buffer extraction illustrated in FIG. 7 and involving the temporary insertion of a Stop Node as explained above. Step 830 will be explained in detail later in this discussion. If the active buffer count R takes a value greater than one, step 810 and following are performed.

In step 810, the value of the BufOption input parameter is tested. If BufOption takes the value CURRENT, step 815 is performed and then control is returned to the application program. In step 815, the ExtractBuf function performs an extraction of the current buffer from the video buffer Ring as illustrated in FIG. 6.

If, on the other hand, the BufOption parameter takes the value LAST, then the ExtractBuf function performs an extraction of the last buffer (i.e. step 820) from the video buffer Ring and then returns control to the application program 250.

Figure 9A:
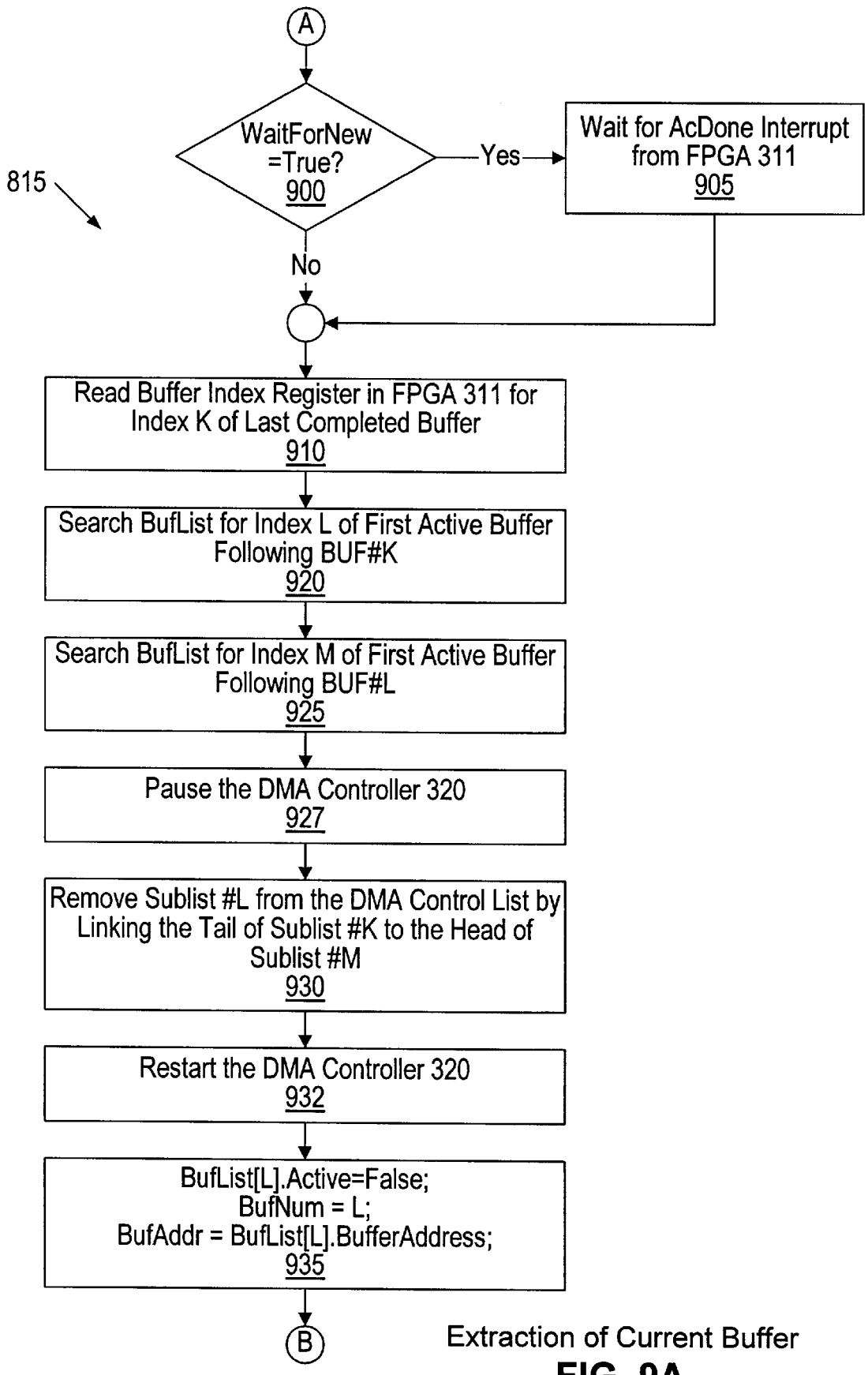
FIG. 9A is a flowchart for extracting the current buffer from the video buffer Ring (i.e. step 815 of FIG. 8) according to the present invention.

Please refer now to FIG. 9A for a flowchart of the process of extracting the current buffer from the video buffer Ring, i.e. step 815 of FIG. 8. In step 900, the ExtractBuf function performs a conditional branching based on the value of the WaitForNew input flag.

If the WaitForNew flag takes the value True, step 905 is performed before step 910. In step 905, the ExtractBuf function waits for the AcDoneFlag in system memory 206 to be reset. Recall that an AcDone interrupt is asserted by the FPGA 311 when the last pixel of a video frame has been acquired into FIFO 340. The AcDone interrupt invokes an AcDone Interrupt Handler routine which sets the AcDoneFlag in system memory 206. The following psuedo-code illustrates waiting for the AcDoneFlag to be reset:

AcDoneFlag=False;
while (AcDoneFlag==False);

First, the AcDoneFlag is written with the value False. Then the AcDoneFlag is repeatedly polled until its value is set to True by the AcDone Interrupt handler routine.

If, on the other hand, the WaitForNew flag takes the value False, step 910 is performed immediately. In step 910, the ExtractBuf function reads the Buffer Index Register of the FPGA 311 to obtain the index K of the last completed video buffer of the video buffer Ring. (Recall that the DMA Controller 320 updates the Buffer Index Register after completing the transfer of a video frame to a video buffer. For example, when the DMA Controller 320 finishes transferring a video frame to BUF#2 of the video buffer ring, the DMA Controller 320 writes the number 2 to the Buffer Index Register.)

Figure 9B:
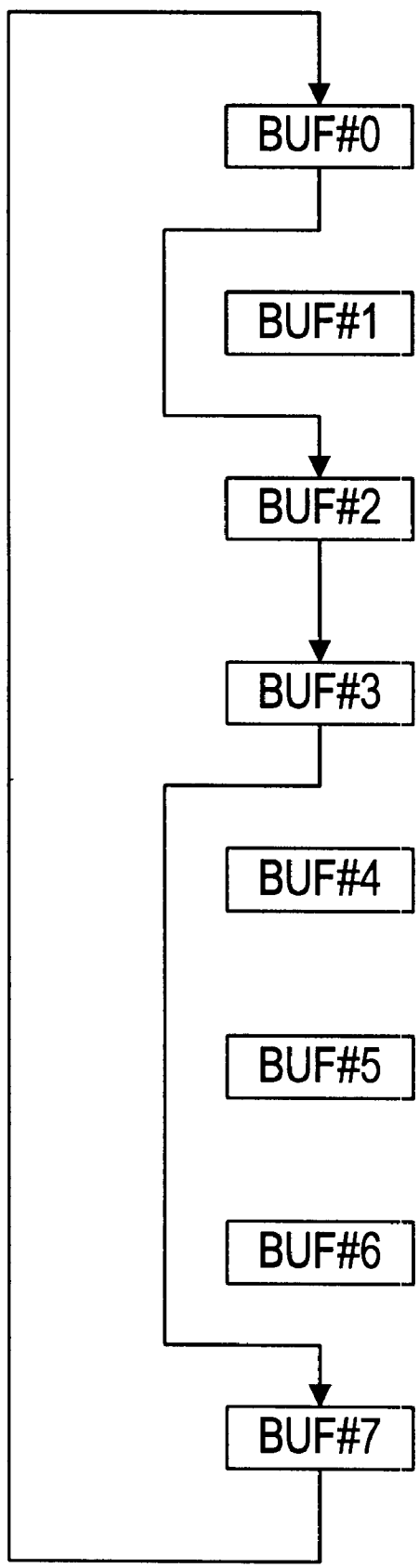
FIG. 9B illustrates the situation where eight video buffers have been allocated in system memory 206.

Please refer now to FIG. 9B which illustrates the situation where eight video buffers have been allocated in system memory 206. Only four of the video buffers remain active, i.e. part of the video buffer Ring: BUF#0, BUF#2, BUF#3, and BUF#7. The other video buffers are said to be inactive. Accordingly, the entries of the array BufList have their Active fields set as follows:

| I | BufList[I] Active |
|---|---|
| 0 | True |
| 1 | False |
| 2 | True |
| 3 | True |
| 4 | False |
| 5 | False |
| 6 | False |
| 7 | True |

In step 920, the ExtractBuf function searches the array BufList for the index L of the first active video buffer which follows BUF#K. Since index K corresponds to the last completed buffer, index L must correspond to the current buffer (i.e. the buffer which is currently being transferred by the DMA Controller 320). For example, in FIG. 9B suppose that the index K of the last completed video buffer is 3. Then, the index L of the first active video buffer which follows BUF#3 is 7. The following psuedo-code illustrates this forward search:

```
L = K;
do
{
    L++;
    if( L==N) L=0;
} while ( !BufList[L].Active && !(L=K) )
```

First, the search index L is initialized with the value of index K, the index of the last completed video buffer. A do-while loop is performed. The do-while loop first increments the search index L, and then resets the search index L to zero if the search index L equals N, the total number of video buffers available. [Recall, the buffer index values range from 0 to N−1 inclusive.] The loop reiterates based on the logical AND of two conditions: (a) BufList[L]. Active must be false, AND, (b) the search index L must not equal K. The loop is not iterated if BufList[L]. Active is true OR search index L equals K. Thus, when the loop exits, the search index L will indicate the first active video buffer which follows BUF#K.

In step 925, the ExtractBuf function searches the array BufList for the index M for the first active video buffer which follows BUF#L. The following psuedo-code illustrates this search forward search:

```
M=L;
do
{
    M++;
    if(M==N) M=0;
} while ( !BufList[M].Active && !(M==L) )
```

Observe that the code fragments for step 920 and 925 are identical except for parameter names. (In the preferred embodiment of the invention, steps 920 and 925 are performed by repeated calls to a common function.) Notice the order K, L, and M of the three successive active buffers. Since BUF#K is the so-called "last buffer" (i.e. the buffer most recently completed by the DMA Controller 320), BUF#L is the current buffer (i.e. the buffer which is presently being filled by DMA Controller 320).

In step 927, the ExtractBuf function sends a Pause signal to the DMA Controller 320 and waits for the Pause signal to take effect. In response to the Pause signal the DMA Controller 320 finishes the Node it is currently processing and halts before fetching the next Node of the DMA Control List. That is, the DMA Controller 320 stops before executing step 510 of FIG. 5C.

In step 930, the ExtractBuf function removes Sublist #L from the DMA Control List by linking the tail for Sublist #K to the Head of Sublist #M. Since Sublist #L is responsible for scheduling video data transfer to BUF#L in the video buffer Ring, the removal of Sublist #L from the DMA Control List causes BUF#L to be extracted from the Ring. The following code line illustrates the linking:

*BufList[K].SE_NextPtr_Ptr=BufList[M].FirstNodeAddress;

The FirstNodeAddress field of array element BufList[M] contains the system memory address of the first Node of Sublist #M. The SE_NextPtr Ptr field of array element BufList[K] contains a pointer; this pointer points to the NextPtr field of the Special Node SE[K], where SE[K] is the Special Node which concludes Sublist #K. Thus, the above code line assigns the FirstNodeAddress of Sublist #M to the NextPtr field of the Special Node SE[K]. (See FIG. 6 for an example).

In step 932, the ExtractBuf function sends a ClearPause signal to the DMA Controller 320 which causes the DMA Controller 320 to resume processing: the DMA Controller 320 first accesses the Node it would have accessed if the Pause signal had not been asserted.

In step 935, the following assignments are performed:
BufList[L]. Active=False;
BufNum=L;
BufAddr=BufList[L].BufferAddress;

The Active flag of BUF#L is set to False, indicating that BUF#L has been removed from the video buffer Ring. The return parameter BufNum is set to L. And the return parameter BufAddr is set to the starting address of BUF#L in system memory 206.

Figure 10:
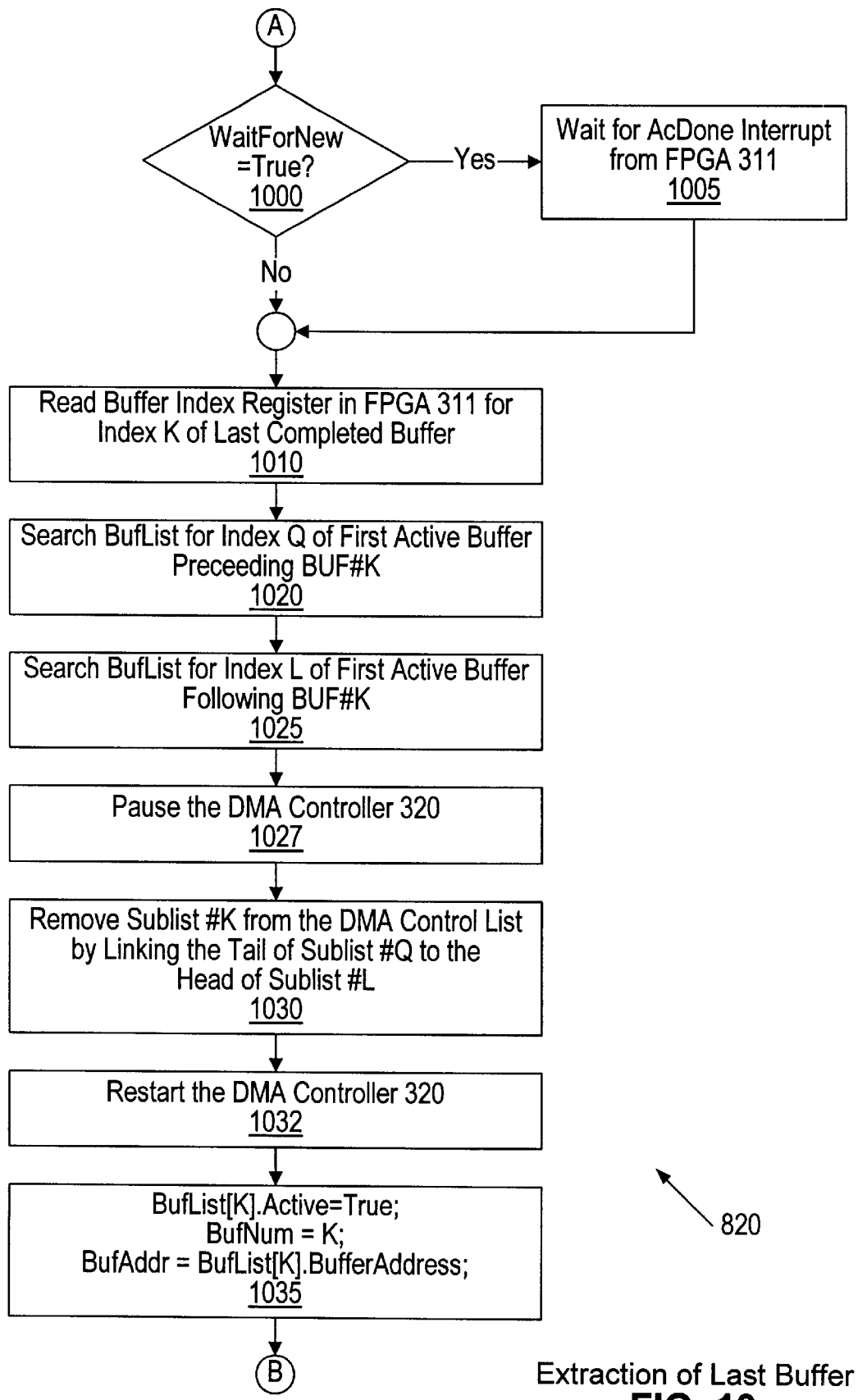
FIG. 10 is a flowchart for the process of extracting the last buffer (i.e. step 820 of FIG. 8) according to the present invention.

Please refer now to FIG. 10 for a flowchart of the process of extracting the last buffer, i.e. step 820 of FIG. 8. In step 1000, the WaitForNew input parameter is tested. If the WaitForNew input parameter takes the value True, the ExtractBuf function waits for the AcDone interrupt to be asserted by the FPGA 311: this waiting comprises step 1005. On the other hand, if the WaitForNew flag takes the value False, the step 1010 is performed immediately.

In step 1010, the ExtractBuf function reads the Buffer Index Register in FPGA 311 for the index K of the last completed buffer.

In step 1020, the ExtractBuf function searches the array BufList for the index Q of the First Active video buffer which preceeds BUF#K. The following code fragment serves to illustrate this backwards search:

```
Q = K;
do
{
    Q--;
    if(Q==-1) Q=N-1;
}
while ( !BufList[Q].Active && !(Q==K) )
```

First, the search index Q is initialized with the value of index K, the index of the last completed video buffer. A do-while loop is performed. The do-while loop first decrements the search index Q, and then resets the search index Q to N−1 if the search index L equals −1. [Recall that N denotes the total number of video buffers available. Also, the buffer index values range from 0 to N−1 inclusive.] The loop reiterates based on the logical AND of two conditions: (a) BufList[Q]. Active must be false, AND, (b) the search index Q must not equal K. The loop is not iterated if BufList[Q]. Active is true OR if the search index Q equals K. Thus, when the loop exits, the search index Q will point to the first active video buffer which precedes BUF#K.

In step 1025, the ExtractBuf function search the array BufList for the index L for the First Active buffer following BUF#K. The method for performing this search is identical to that used for step 925 of FIG. 9A described above.

In step 1027, the ExtractBuf function sends a Pause signal to the DMA Controller 320 and waits for the Pause signal to take effect. In response to the Pause signal the DMA Controller 320 finishes the Node it is currently processing and halts before fetching the next Node of the DMA Control List. That is, the DMA Controller 320 stops before executing step 510 of FIG. 5C.

In step 1030, the ExtractBuf function removes Sublist #K from the DMA Control List by linking the tail of Sublist #Q to the Head of Sublist #L. Since Sublist #K is responsible for scheduling video data transfer to BUF#K in the video buffer Ring, the removal of Sublist #K from the DMA Control List causes BUF#K to be extracted from the Ring. The following code line illustrates the linking:

*BufList[Q].SE_NextPtr_Ptr=BufList[L] .FirstNodeAddress;

The FirstNodeAddress field of array element BufList[L] contains the system memory address of the first Node of Sublist #L. The SE_NextPtr Ptr field of array element BufList[Q] contains a pointer; this pointer points to the NextPtr field of the Special Node SE[Q], where SE[Q] is the Special Node which concludes Sublist #Q. Thus, the above code line assigns the FirstNodeAddress of Sublist #L to the NextPtr field of the Special Node SE[Q]. (See FIG. 6 for an example).

In step 1032, the ExtractBuf function sends a ClearPause signal to the DMA Controller 320 which causes the DMA Controller 320 to resume processing: the DMA Controller 320 first accesses the Node it would have accessed if the Pause signal had not been asserted.

In step 1035, the following assignments are performed:
BufList[K]. Active=False;
BufNum=K;
BufAddr=BufList[K].BufferAddress;
The Active Flag for BUF#K is set to False, indicating that BUF#K has been removed from the video buffer Ring. The return parameter BufNum is set equal to the index K of the last completed buffer. Also, the return parameter BufAddr is set equal to the starting address of BUF#K in system memory 206.

Figure 11:
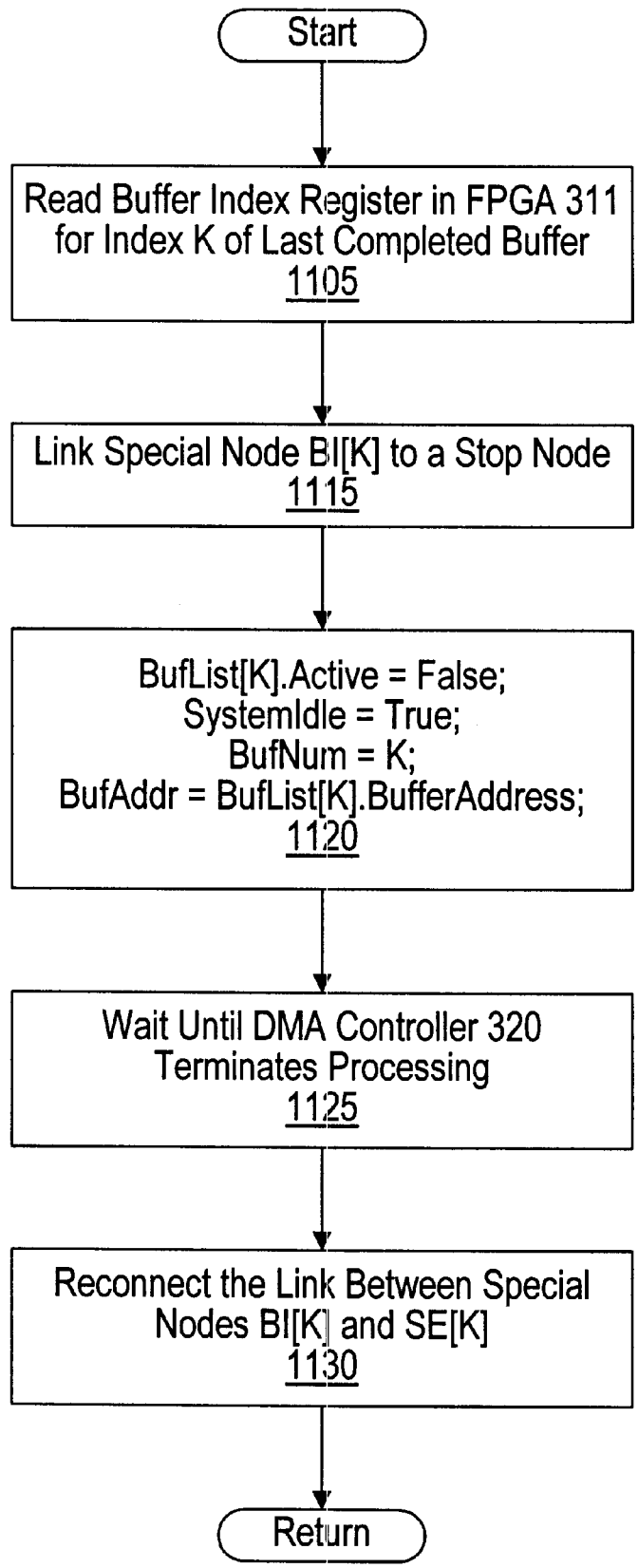
FIG. 11 is a flowchart illustrating the special case buffer extraction when there is only one active buffer in the video buffer Ring according to the present invention.

Please refer now to FIG. 11 for a flowchart illustrating the special case buffer extraction when there is only one active buffer in the video buffer Ring, i.e. step 830 of FIG. 8. In step 1105, the ExtractBuf function reads the Buffer Index Register in FPGA 311 to obtain the index K of the last completed buffer.

In step 1115, the special Node BI[K], which is the penultimate Node of Sublist #K, is linked to a Stop Node. (See FIG. 7 for example). Recall that the DMA Controller 320 is designed to halt when it encounters a Stop Node. Also recall that a Stop Node is defined by having a TransferCount field equal to 0×0. Let HALT be a Stop Node which has been allocated during system initialization:
Node HALT;
HALT.TransferCount=0×0;
where Node is the data type defined above in the discussion of the DMA Control List. The following code line illustrates step 1115:

*BufList[K].BI_NextPtr_Ptr=&HALT;

The BI_NextPtr_Ptr field of array element BufList[K] contains a pointer: this pointer points to the NextPtr field of the Special Node BI[K] which is the second to last Node of Sublist #K. Thus, the address of the Stop Node HALT is assigned to the NextPtr field of the Special Node BI[K].

In step 1120, the ExtractBuf function performs a number of assignments:
BufList[K]. Active=False;
SystemIdle=True;
BufNum=K;
BufAddr=BufList[K].BufferAddress;
The Active flag of BUF#K is set to False indicating that BUF#K has been removed from the DMA Control List. The SystemIdle flag is set to True to indicate that the DMA Control List has null length, and therefore the video capture system is no longer capturing frames. The return parameter BufNum is set to the value of index K. Also the return parameter BufAddr is set to the starting address of BUF#K in system memory 206: this starting address is stored as the BufferAddress field of the array element BufList[K].

In step 1125, the ExtractBuf function waits until the DMA Controller 320 terminates processing.
In the preferred embodiment of the invention this involves repeatedly polling a register internal to the DMA controller 320 to determine when a termination bit has been set.

In step 1130, the ExtractBuf function reconnects the Link Between the Special Nodes BI[K] and SE[K]. The following code line illustrates this reconnection:

*BufList[K].BI_NextPtr_Ptr=BufList[K].SE_ NodeAddress

The BI_NextPtr Ptr_field of the array element BufList[K] contains a pointer: this pointer points to the NextPtr field of Special Node BI[K] which is the second to last Node of Sublist #K. The SE_NodeAddress field of BufList[K] contains the address of Special Node SE[K] which concludes Sublist #K. The address of the Special Node SE[K] is assigned to the NextPtr field of Special Node BI[K].

Figure 12:
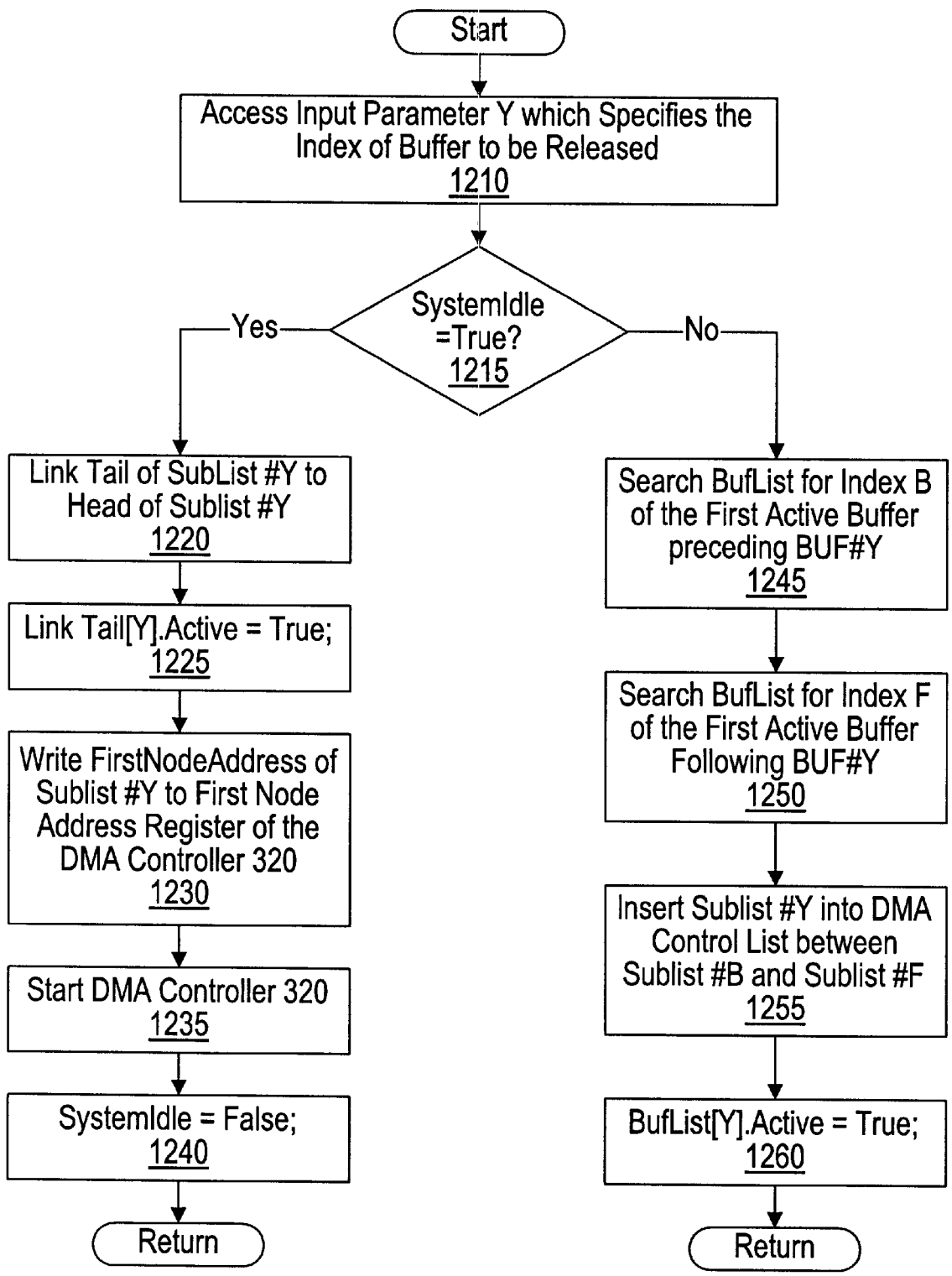
FIG. 12 is a flowchart for the ReleaseBuf function according to the present invention.

Now, the operation of the ReleaseBuf function will be described. The function ReleaseBuf is called by the application program 250 to restore a video buffer to the video buffer Ring. The ReleaseBuf function is called with an input parameter Y which specifies the index of the video buffer to be restored:

ReleaseBuf(Y);

Please refer to FIG. 12 for a flowchart for the ReleaseBuf function. In step 1210, the ReleaseBuf function 1210 accesses the buffer selection input parameter Y which specifies the index of the video buffer to be restored to the video buffer Ring. In step 1215, the value of the SystemIdle flag is tested. If the SystemIdle flag takes the value True, then the DMA Controller 320 is in a halted state, and the DMA Control List is empty. In this case, the ReleaseBuf function regenerates the DMA Control List from Sublist #Y which corresponds to BUF#Y, and restarts the DMA Controller 320.

Thus in step 1220, the ReleaseBuf function links the tail of Sublist #Y to the head of Sublist #Y. The following code line illustrates this linking:

*BufList[Y].SE_NextPtr_Ptr=BufList[Y].FirstNodeAddress.

The pointer BufList[Y].SE_NextPtr_Ptr points to last Node (SE[Y]) of Sublist #Y, and in particular to the NextPtr field of this last Node. The FirstNodeAddress field of array element BufList[Y] contains the system memory address of the first Node of Sublist #Y.

In step 1225, the Active flag of array element BufList[Y] is set to True in anticipation of the restoration of BUF#Y to the video buffer Ring.

In step 1230, the ReleaseBuf function writes the FirstNodeAddress of Sublist #Y to the First Node Address Register of the DMA Controller 320.

In step 1235, the DMA Controller 320 sends a start signal to the DMA Controller 320. In response to the start signal, the DMA Controller 320 starts accessing and processing Node from the presently recreated DMA Control List: processing starts with step 504 of FIG. 5C.

In step 1240, the SystemIdle flag is set to False, since the DMA Controller 320 has been reactivated. After step 1240, control is returned to the application program 250.

If, in step 1215, the SystemIdle flag takes the value False, then Sublist #Y is inserted into a preexisting DMA Control List. Please refer momentarily to FIG. 2E. On the left of FIG. 2E, the DMA Control List is illustrated as it appears when the function ReleaseBuf is called with buffer selection parameter Y equal to four: ReleaseBuf(4). Observe that the first active buffer which preceeds BUF#4 is BUF#3. And the first active buffer which follow BUF#4 is BUF#7. In this case, the ReleaseBuffer function would insert Sublist #4 into the DMA Control List between Sublist #3 and Sublist #7.

In step 1245, the ReleaseBuf function searches the array BufList for the index B of the first active buffer which preceeds BUF#Y. In step 1250, the ReleaseBuf function searches the array BufList for the index F of the first active buffer which follows BUF#Y. In step 1255, the ReleaseBuf function inserts Sublist #Y into the DMA Control List between Sublist #B and Sublist #F. The follow code fragment illustrates this insertion:

BufList[Y].SE_NextPtr_Ptr=BufList[F].FirstNodeAddress;
BufList[B].SE_NextPtr_Ptr=BufList[Y].FirstNodeAddress;

The tail of Sublist #Y is linked to the head of Sublist #F, and the tail of Sublist #B is linked to the head of Sublist #Y.

In step 1260, the Active flag of array element BufList[Y] is set to True indicating that BUF#Y has been restored to the video buffer Ring, or equivalently that Sublist #Y has been restored to the DMA Control List. After step 1260, control is returned to the application program 250.

What is claimed is:

1. An image acquisition system for acquiring digital video data from a video sequence and storing the frames in a computer memory, the image acquisition system comprising:

a buffer memory which receives and stores the digital video data;

a computer memory which includes a plurality of frame buffers each operable to store digital video data corresponding to a video frame;

a direct memory access (DMA) controller coupled to the buffer memory which is operable to transfer digital video data from the buffer memory to the computer memory;

a frame buffer access list which stores information indicating availability of said plurality of frame buffers in said computer memory;

wherein said direct memory access controller is operable to access said frame buffer access list and uses values in said frame buffer access list to transfer said digital video data from said buffer memory to available ones of said frame buffers in the computer memory, wherein said values in said frame buffer access list determine said available ones of said frame buffers;

wherein said values in said frame buffer access list are manipulable to exclude one or more selected frame buffers of the plurality of frame buffers from receiving said digital video data, wherein after a first manipulation of the frame buffer access list to exclude the one or more selected frame buffers from the plurality of frame buffers, said direct memory access controller continues to transfer said digital video data from said buffer memory to remaining available ones of the plurality of frame buffers.

2. The system of claim 1, wherein the image acquisition system is comprised in a computer system;

wherein the image acquisition system further comprises:
a CPU coupled to the computer memory which is operable to process digital video data stored in one or more of said frame buffers in the computer memory;
wherein the CPU is operable to perform said first manipulation of the frame buffer access list to exclude the one or more selected frame buffers from the plurality of frame buffers.

3. The system of claim 2,
wherein the CPU is operable to process digital video data in said one or more selected frame buffers while said remaining available frame buffers continue to receive digital video data from the buffer memory.

4. The system of claim 3, wherein the CPU is operable to perform a second manipulation of said values in said frame buffer access list to restore availability of said one or more selected frame buffers in the computer memory for receiving new digital video data from said buffer memory.

5. The system of claim 1, wherein said frame buffer access list is comprised in the computer memory.

6. The system of claim 1, wherein said frame buffer access list comprises a linked list of references to said plurality of frame buffers in the computer memory;

wherein a reference in said linked list is removed to exclude the corresponding frame buffer in the computer memory from the plurality of frame buffers;

wherein the reference is added to the linked list to restore availability of the corresponding frame buffer in the computer memory for receiving new digital video data from said buffer memory.

7. The system of claim 1, wherein the system includes an interface card comprised in a computer system, wherein the buffer memory and the DMA controller are comprised on the interface card.

8. The system of claim 1, wherein said first manipulation excludes a last received frame buffer in the computer memory.

9. The system of claim 1, further comprising a CPU which is configured (a) to identify a first frame buffer which is currently receiving digital video data from said buffer memory, (b) to wait until the completion of a digital video data transfer to the first frame buffer, and (c) to perform the first manipulation to exclude the first frame buffer from the plurality of frame buffers.

10. A method for acquiring digital video data from a video sequence into a computer memory which comprises a plurality of frame buffers, the method comprising:

receiving digital video data;

storing the digital video data in a buffer memory;

a direct memory access controller transferring said digital video data from the buffer memory to available ones of said frame buffers, wherein each of said frame buffers is sufficient to store a video frame;

wherein said transferring is controlled by a frame buffer access list, wherein said frame buffer access list stores information which indicates availability of said plurality of frame buffers for digital video data transfer;

manipulating values in said frame buffer access list to exclude one or more selected frame buffers of the plurality of frame buffers from receiving said digital video data; and said direct memory access controller continuing to transfer said digital video data from said buffer memory to remaining available ones of the plurality of frame buffers after said manipulating, wherein said one or more selected frame buffers do not receive said digital video data.

11. The method of claim 10, wherein said transferring comprises:

examining said frame buffer access list;

determining which of said frame buffers are available in response to said examining; and transferring said digital video data to one or more of said plurality of frame buffers determined to be available in said determining.

12. The method of claim 11, wherein said examining said frame buffer access list identifies a most recently completed frame buffer, and wherein said manipulating values in said frame buffer access list disables availability of said most recently completed frame buffer for receiving new digital video data from said buffer memory.

13. The method of claim 11, wherein said examining said frame buffer access list identifies a current frame buffer, and wherein said manipulating values in said frame buffer access list disabled availability of said current frame buffer for receiving new digital video data from said buffer memory.

14. The method of claim 10, further comprising:

processing digital video data stored in said one or more selected frame buffers.

15. The method of claim 10, wherein the method operates in an image acquisition system including a CPU;

wherein the CPU performs said manipulating of said values in said frame buffer access list and processes said digital video data stored in said one or more selected frame buffers.

16. The method of claim 11, further comprising:

manipulating said values in said frame buffer access list to restore availability of said one or more selected frame buffers for receiving new digital video data from said buffer memory.

17. The method of claim 10, wherein said frame buffer access list comprises a linked list of references to said plurality of frame buffers in the computer memory;

wherein removing a reference in said linked list excludes a corresponding frame buffer in the computer memory from the plurality of frame buffers;

wherein restoring the reference to the linked list restores availability of the corresponding frame buffer for receiving new digital video data from said buffer memory.

18. An image acquisition system comprising:

a processor;

a system memory;

a direct memory access (DMA) controller configured to read and execute nodes in a circularly-linked control list stored in system memory, wherein the DMA controller (a) receives a first stream of digitized video frames and (b) transfers the first stream of digitized video frames to a set of video buffers in system memory under the control of the control list;

wherein the control list comprises a set of sublists in one-to-one correspondence with the set of video buffers in system memory, wherein each of the sublists contains one or more transfer nodes, wherein each of said one or more transfer nodes (c) specifies a target address in system memory and a data transfer length and (d) instructs the DMA controller to transfer video data comprising at least a portion of one of said digitized video frames to system memory starting at the target address, wherein the data transfer length defines the number of data units to be transferred to system memory starting at the target address;

wherein the processor is configured to alter the linkage structure of the control list to remove a first sublist from control list so that a first video buffer corresponding to the first sublist is no longer targeted for transfers by the DMA controller.

19. A method comprising:

receiving a first stream of video data and buffering the first stream of video data in a First-In-First-Out buffer (FIFO);

performing a series of direct memory access (DMA) transfers from the FIFO to a set of video buffers in a system memory under the control of a circularly-linked control list stored in the system memory, wherein the control list comprises a set of sublists in one-to-one correspondence with the set of video buffers in system memory, wherein each of the sublists contains one or more transfer nodes, wherein each of said one or more transfer nodes specifies a target address in system memory and a data transfer length for one of said series of DMA transfers;

altering the linkage structure of the control list to remove a first sublist from control list so that a first video buffer corresponding to the first sublist is no longer targeted by any of said series of DMA transfers.

* * * * *